United States Patent
Boesen et al.

(10) Patent No.: US 10,205,814 B2
(45) Date of Patent: Feb. 12, 2019

(54) WIRELESS EARPIECE WITH WALKIE-TALKIE FUNCTIONALITY

(71) Applicant: BRAGI GmbH, München (DE)

(72) Inventors: Peter Vincent Boesen, München (DE); Martin Steiner, München (DE)

(73) Assignee: BRAGI GmbH, München (DE)

(*) Notice: Subject to any disclaimer, the term of this patent is extended or adjusted under 35 U.S.C. 154(b) by 0 days.

(21) Appl. No.: 15/802,605

(22) Filed: Nov. 3, 2017

(65) Prior Publication Data

US 2018/0124225 A1    May 3, 2018

Related U.S. Application Data

(60) Provisional application No. 62/416,979, filed on Nov. 3, 2016.

(51) Int. Cl.
| H04M 1/60 | (2006.01) |
| G06F 3/01 | (2006.01) |
| G10L 15/26 | (2006.01) |
| H04B 1/3827 | (2015.01) |

(52) U.S. Cl.
CPC .......... *H04M 1/6066* (2013.01); *G06F 3/012* (2013.01); *G10L 15/265* (2013.01); *G06F 3/017* (2013.01); *H04B 2001/3866* (2013.01); *H04R 2420/07* (2013.01)

(58) Field of Classification Search
CPC ...... H04M 1/6066; G06F 3/012; G06F 3/017; G10L 15/265; H04R 2420/07; H04B 2001/3866
See application file for complete search history.

(56) References Cited

U.S. PATENT DOCUMENTS

| 2,325,590 A | 8/1943 | Carlisle et al. |
| 2,430,229 A | 11/1947 | Kelsey |
| 3,047,089 A | 7/1962 | Zwislocki |
| D208,784 S | 10/1967 | Sanzone |

(Continued)

FOREIGN PATENT DOCUMENTS

| CN | 204244472 U | 4/2015 |
| CN | 104683519 A | 6/2015 |

(Continued)

OTHER PUBLICATIONS

Akkermans, "Acoustic Ear Recognition for Person Identification", Automatic Identification Advanced Technologies, 2005 pp. 219-223.

(Continued)

*Primary Examiner* — Dong-Chang Shiue
(74) *Attorney, Agent, or Firm* — Goodhue, Coleman & Owens, P.C.

(57) ABSTRACT

A method of audio messaging between users of earpiece wearables includes connecting an earpiece wearable associated with a first user with an earpiece wearable associated with a second user and sending and receiving audio messages between the earpiece wearable associated with the first user and the earpiece wearable associated with the second user, wherein the sending of the audio messages is activated by head movement sensed with an inertial sensor of the earpiece wearable performing the sending. The method further includes maintaining a record of the audio messages stored on a machine readable memory.

20 Claims, 12 Drawing Sheets

(56) References Cited

U.S. PATENT DOCUMENTS

| | | |
|---|---|---|
| 3,586,794 A | 6/1971 | Michaelis |
| 3,934,100 A | 1/1976 | Harada |
| 3,983,336 A | 9/1976 | Malek et al. |
| 4,069,400 A | 1/1978 | Johanson et al. |
| 4,150,262 A | 4/1979 | Ono |
| 4,334,315 A | 6/1982 | Ono et al. |
| D266,271 S | 9/1982 | Johanson et al. |
| 4,375,016 A | 2/1983 | Harada |
| 4,588,867 A | 5/1986 | Konomi |
| 4,617,429 A | 10/1986 | Bellafiore |
| 4,654,883 A | 3/1987 | Iwata |
| 4,682,180 A | 7/1987 | Gans |
| 4,791,673 A | 12/1988 | Schreiber |
| 4,852,177 A | 7/1989 | Ambrose |
| 4,865,044 A | 9/1989 | Wallace et al. |
| 4,984,277 A | 1/1991 | Bisgaard et al. |
| 5,008,943 A | 4/1991 | Arndt et al. |
| 5,185,802 A | 2/1993 | Stanton |
| 5,191,602 A | 3/1993 | Regen et al. |
| 5,201,007 A | 4/1993 | Ward et al. |
| 5,201,008 A | 4/1993 | Arndt et al. |
| D340,286 S | 10/1993 | Seo |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,347,584 A | 9/1994 | Narisawa |
| 5,363,444 A | 11/1994 | Norris |
| D367,113 S | 2/1996 | Weeks |
| 5,497,339 A | 3/1996 | Bernard |
| 5,606,621 A | 2/1997 | Reiter et al. |
| 5,613,222 A | 3/1997 | Guenther |
| 5,654,530 A | 8/1997 | Sauer et al. |
| 5,692,059 A | 11/1997 | Kruger |
| 5,721,783 A | 2/1998 | Anderson |
| 5,748,743 A | 5/1998 | Weeks |
| 5,749,072 A | 5/1998 | Mazurkiewicz et al. |
| 5,771,438 A | 6/1998 | Palermo et al. |
| D397,796 S | 9/1998 | Yabe et al. |
| 5,802,167 A | 9/1998 | Hong |
| D410,008 S | 5/1999 | Almqvist |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,084,526 A | 7/2000 | Blotky et al. |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,208,372 B1 | 3/2001 | Barraclough |
| 6,230,029 B1 | 5/2001 | Yegiazaryan et al. |
| 6,275,789 B1 | 8/2001 | Moser et al. |
| 6,339,754 B1 | 1/2002 | Flanagan et al. |
| D455,835 S | 4/2002 | Anderson et al. |
| 6,408,081 B1 | 6/2002 | Boesen |
| 6,424,820 B1 | 7/2002 | Burdick et al. |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,563,301 B2 | 5/2003 | Gventer |
| 6,654,721 B2 | 11/2003 | Handelman |
| 6,664,713 B2 | 12/2003 | Boesen |
| 6,690,807 B1 | 2/2004 | Meyer |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,010,137 B1 | 3/2006 | Leedom et al. |
| 7,113,611 B2 | 9/2006 | Leedom et al. |
| D532,520 S | 11/2006 | Kampmeier et al. |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| D549,222 S | 8/2007 | Huang |
| D554,756 S | 11/2007 | Sjursen et al. |
| 7,403,629 B1 | 7/2008 | Aceti et al. |
| D579,006 S | 10/2008 | Kim et al. |
| 7,463,902 B2 | 12/2008 | Boesen |
| 7,508,411 B2 | 3/2009 | Boesen |
| D601,134 S | 9/2009 | Elabidi et al. |
| 7,825,626 B2 | 11/2010 | Kozisek |
| 7,965,855 B1 | 6/2011 | Ham |
| 7,979,035 B2 | 7/2011 | Griffin et al. |
| 7,983,628 B2 | 7/2011 | Boesen |
| D647,491 S | 10/2011 | Chen et al. |
| 8,095,188 B2 | 1/2012 | Shi |
| 8,108,143 B1 | 1/2012 | Tester |
| 8,140,357 B1 | 3/2012 | Boesen |
| 8,160,265 B2 * | 4/2012 | Mao ............ H04S 7/304 381/309 |
| D666,581 S | 9/2012 | Perez |
| 8,300,864 B2 | 10/2012 | Müllenborn et al. |
| 8,406,448 B2 | 3/2013 | Lin |
| 8,430,817 B1 | 4/2013 | Al-Ali et al. |
| 8,436,780 B2 | 5/2013 | Schantz et al. |
| D687,021 S | 7/2013 | Yuen |
| 8,679,012 B1 | 3/2014 | Kayyali |
| 8,719,877 B2 | 5/2014 | VonDoenhoff et al. |
| 8,774,434 B2 | 7/2014 | Zhao et al. |
| 8,831,266 B1 | 9/2014 | Huang |
| 8,891,800 B1 | 11/2014 | Shaffer |
| 8,994,498 B2 | 3/2015 | Agrafioti et al. |
| D728,107 S | 4/2015 | Martin et al. |
| 9,013,145 B2 | 4/2015 | Castillo et al. |
| 9,037,125 B1 | 5/2015 | Kadous |
| D733,103 S | 6/2015 | Jeong et al. |
| 9,081,944 B2 | 7/2015 | Camacho et al. |
| 9,510,159 B1 | 11/2016 | Cuddihy et al. |
| D773,439 S | 12/2016 | Walker |
| D775,158 S | 12/2016 | Dong et al. |
| D777,710 S | 1/2017 | Palmborg et al. |
| 9,544,689 B2 | 1/2017 | Fisher et al. |
| D788,079 S | 5/2017 | Son et al. |
| 2001/0005197 A1 | 6/2001 | Mishra et al. |
| 2001/0027121 A1 | 10/2001 | Boesen |
| 2001/0043707 A1 | 11/2001 | Leedom |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0160511 A1 | 8/2004 | Boesen |
| 2005/0017842 A1 | 1/2005 | Dematteo |

(56) References Cited

U.S. PATENT DOCUMENTS

| | | |
|---|---|---|
| 2005/0043056 A1 | 2/2005 | Boesen |
| 2005/0094839 A1 | 5/2005 | Gwee |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |
| 2005/0266876 A1 | 12/2005 | Boesen |
| 2006/0029246 A1 | 2/2006 | Boesen |
| 2006/0073787 A1 | 4/2006 | Lair et al. |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0220915 A1 | 10/2006 | Bauer |
| 2006/0258412 A1 | 11/2006 | Liu |
| 2008/0076972 A1 | 3/2008 | Dorogusker et al. |
| 2008/0090622 A1 | 4/2008 | Kim et al. |
| 2008/0146890 A1 | 6/2008 | LeBoeuf et al. |
| 2008/0187163 A1 | 8/2008 | Goldstein et al. |
| 2008/0253583 A1 | 10/2008 | Goldstein et al. |
| 2008/0254780 A1 | 10/2008 | Kuhl et al. |
| 2008/0255430 A1 | 10/2008 | Alexandersson et al. |
| 2008/0298606 A1 | 12/2008 | Johnson et al. |
| 2009/0003620 A1 | 1/2009 | McKillop et al. |
| 2009/0008275 A1 | 1/2009 | Ferrari et al. |
| 2009/0017881 A1 | 1/2009 | Madrigal |
| 2009/0073070 A1 | 3/2009 | Rofougaran |
| 2009/0097689 A1 | 4/2009 | Prest et al. |
| 2009/0105548 A1 | 4/2009 | Bart |
| 2009/0154739 A1 | 6/2009 | Zellner |
| 2009/0191920 A1 | 7/2009 | Regen et al. |
| 2009/0245559 A1 | 10/2009 | Boltyenkov et al. |
| 2009/0261114 A1 | 10/2009 | McGuire et al. |
| 2009/0296968 A1 | 12/2009 | Wu et al. |
| 2010/0033313 A1 | 2/2010 | Keady et al. |
| 2010/0203831 A1 | 8/2010 | Muth |
| 2010/0210212 A1 | 8/2010 | Sato |
| 2010/0320961 A1 | 12/2010 | Castillo et al. |
| 2011/0140844 A1 | 6/2011 | McGuire et al. |
| 2011/0239497 A1 | 10/2011 | McGuire et al. |
| 2011/0286615 A1 | 11/2011 | Olodort et al. |
| 2012/0057740 A1 | 3/2012 | Rosal |
| 2012/0155670 A1 | 6/2012 | Rutschman |
| 2012/0166203 A1* | 6/2012 | Fuchs .................. G06F 19/325 704/275 |
| 2012/0269359 A1* | 10/2012 | Spittle .................. H04R 27/00 381/77 |
| 2012/0309453 A1 | 12/2012 | Maguire |
| 2013/0106454 A1 | 5/2013 | Liu et al. |
| 2013/0316642 A1* | 11/2013 | Newham .......... H04W 52/0206 455/11.1 |
| 2013/0316679 A1* | 11/2013 | Miller .................. H04M 1/6041 455/412.1 |
| 2013/0346168 A1 | 12/2013 | Zhou et al. |
| 2014/0004912 A1 | 1/2014 | Rajakarunanayake |
| 2014/0014697 A1 | 1/2014 | Schmierer et al. |
| 2014/0020089 A1 | 1/2014 | Perini, II |
| 2014/0072136 A1 | 3/2014 | Tenenbaum et al. |
| 2014/0079257 A1 | 3/2014 | Ruwe et al. |
| 2014/0106677 A1 | 4/2014 | Altman |
| 2014/0122116 A1 | 5/2014 | Smythe |
| 2014/0146973 A1 | 5/2014 | Liu et al. |
| 2014/0153768 A1 | 6/2014 | Hagen et al. |
| 2014/0163771 A1 | 6/2014 | Demeniuk |
| 2014/0185828 A1 | 7/2014 | Helbling |
| 2014/0219467 A1 | 8/2014 | Kurtz |
| 2014/0222462 A1 | 8/2014 | Shakil et al. |
| 2014/0235169 A1 | 8/2014 | Parkinson et al. |
| 2014/0270227 A1 | 9/2014 | Swanson |
| 2014/0270271 A1 | 9/2014 | Dehe et al. |
| 2014/0335908 A1 | 11/2014 | Krisch et al. |
| 2014/0348367 A1 | 11/2014 | Vavrus et al. |
| 2015/0028996 A1 | 1/2015 | Agrafioti et al. |
| 2015/0035643 A1 | 2/2015 | Kursun |
| 2015/0036835 A1 | 2/2015 | Chen |
| 2015/0110587 A1 | 4/2015 | Hori |
| 2015/0148989 A1 | 5/2015 | Cooper et al. |
| 2015/0181356 A1 | 6/2015 | Krystek et al. |
| 2015/0222977 A1* | 8/2015 | Angel, Jr. .............. H04R 1/105 381/74 |
| 2015/0245127 A1 | 8/2015 | Shaffer |
| 2015/0264472 A1 | 9/2015 | Aase |
| 2015/0264501 A1 | 9/2015 | Hu et al. |
| 2015/0358751 A1 | 12/2015 | Deng et al. |
| 2015/0359436 A1 | 12/2015 | Shim et al. |
| 2015/0373467 A1 | 12/2015 | Gelter |
| 2015/0373474 A1 | 12/2015 | Kraft et al. |
| 2016/0033280 A1 | 2/2016 | Moore et al. |
| 2016/0034249 A1 | 2/2016 | Lee et al. |
| 2016/0071526 A1 | 3/2016 | Wingate et al. |
| 2016/0072558 A1 | 3/2016 | Hirsch et al. |
| 2016/0073189 A1 | 3/2016 | Lindén et al. |
| 2016/0125892 A1 | 5/2016 | Bowen et al. |
| 2016/0162259 A1 | 6/2016 | Zhao et al. |
| 2016/0209691 A1 | 7/2016 | Yang et al. |
| 2016/0320199 A1* | 11/2016 | Chen .................. G01C 21/3664 |
| 2016/0324478 A1 | 11/2016 | Goldstein |
| 2016/0353196 A1 | 12/2016 | Baker et al. |
| 2016/0360350 A1 | 12/2016 | Watson et al. |
| 2017/0059152 A1 | 3/2017 | Hirsch et al. |
| 2017/0060262 A1 | 3/2017 | Hviid et al. |
| 2017/0060269 A1 | 3/2017 | Förstner et al. |
| 2017/0061751 A1 | 3/2017 | Loermann et al. |
| 2017/0062913 A1 | 3/2017 | Hirsch et al. |
| 2017/0064426 A1 | 3/2017 | Hviid |
| 2017/0064428 A1 | 3/2017 | Hirsch |
| 2017/0064432 A1 | 3/2017 | Hviid et al. |
| 2017/0064437 A1 | 3/2017 | Hviid et al. |
| 2017/0078780 A1 | 3/2017 | Qian et al. |
| 2017/0078785 A1 | 3/2017 | Qian et al. |
| 2017/0108918 A1 | 4/2017 | Boesen |
| 2017/0109131 A1 | 4/2017 | Boesen |
| 2017/0110124 A1 | 4/2017 | Boesen et al. |
| 2017/0110899 A1 | 4/2017 | Boesen |
| 2017/0111723 A1 | 4/2017 | Boesen |
| 2017/0111725 A1 | 4/2017 | Boesen et al. |
| 2017/0111726 A1 | 4/2017 | Martin et al. |
| 2017/0111740 A1 | 4/2017 | Hviid et al. |
| 2017/0127168 A1 | 5/2017 | Briggs et al. |
| 2017/0131094 A1 | 5/2017 | Kulik |
| 2017/0142511 A1 | 5/2017 | Dennis |
| 2017/0146801 A1 | 5/2017 | Stempora |
| 2017/0151447 A1 | 6/2017 | Boesen |
| 2017/0151668 A1 | 6/2017 | Boesen |
| 2017/0151918 A1 | 6/2017 | Boesen |
| 2017/0151930 A1 | 6/2017 | Boesen |
| 2017/0151957 A1 | 6/2017 | Boesen |
| 2017/0151959 A1 | 6/2017 | Boesen |
| 2017/0153114 A1 | 6/2017 | Boesen |
| 2017/0153636 A1 | 6/2017 | Boesen |
| 2017/0154532 A1 | 6/2017 | Boesen |
| 2017/0155985 A1 | 6/2017 | Boesen |
| 2017/0155992 A1 | 6/2017 | Perianu et al. |
| 2017/0155993 A1 | 6/2017 | Boesen |
| 2017/0155997 A1 | 6/2017 | Boesen |
| 2017/0155998 A1 | 6/2017 | Boesen |
| 2017/0156000 A1 | 6/2017 | Boesen |
| 2017/0178631 A1 | 6/2017 | Boesen |
| 2017/0180842 A1 | 6/2017 | Boesen |
| 2017/0180843 A1 | 6/2017 | Perianu et al. |
| 2017/0180897 A1 | 6/2017 | Perianu |
| 2017/0188127 A1 | 6/2017 | Perianu et al. |
| 2017/0188132 A1 | 6/2017 | Hirsch et al. |
| 2017/0193978 A1 | 7/2017 | Goldman |
| 2017/0195829 A1 | 7/2017 | Belverato et al. |
| 2017/0208393 A1 | 7/2017 | Boesen |
| 2017/0214987 A1 | 7/2017 | Boesen |
| 2017/0215016 A1 | 7/2017 | Dohmen et al. |
| 2017/0230752 A1 | 8/2017 | Dohmen et al. |
| 2017/0251933 A1 | 9/2017 | Braun et al. |
| 2017/0257698 A1 | 9/2017 | Boesen et al. |
| 2017/0263236 A1 | 9/2017 | Boesen et al. |
| 2017/0273622 A1 | 9/2017 | Boesen |

(56) References Cited

U.S. PATENT DOCUMENTS

| | | |
|---|---|---|
| 2017/0280257 A1 | 9/2017 | Gordon et al. |
| 2017/0366233 A1 | 12/2017 | Hviid et al. |
| 2018/0007994 A1 | 1/2018 | Boesen et al. |
| 2018/0008194 A1 | 1/2018 | Boesen |
| 2018/0008198 A1 | 1/2018 | Kingscott |
| 2018/0009447 A1 | 1/2018 | Boesen et al. |
| 2018/0011006 A1 | 1/2018 | Kingscott |
| 2018/0011682 A1 | 1/2018 | Milevski et al. |
| 2018/0011994 A1 | 1/2018 | Boesen |
| 2018/0012228 A1 | 1/2018 | Milevski et al. |
| 2018/0013195 A1 | 1/2018 | Hviid et al. |
| 2018/0014102 A1 | 1/2018 | Hirsch et al. |
| 2018/0014103 A1 | 1/2018 | Martin et al. |
| 2018/0014104 A1 | 1/2018 | Boesen et al. |
| 2018/0014107 A1 | 1/2018 | Razouane et al. |
| 2018/0014108 A1 | 1/2018 | Dragicevic et al. |
| 2018/0014109 A1 | 1/2018 | Boesen |
| 2018/0014113 A1 | 1/2018 | Boesen |
| 2018/0014140 A1 | 1/2018 | Milevski et al. |
| 2018/0014436 A1 | 1/2018 | Milevski |
| 2018/0034951 A1 | 2/2018 | Boesen |
| 2018/0040093 A1 | 2/2018 | Boesen |
| 2018/0069815 A1* | 3/2018 | Fontana .................. H04L 51/04 |

FOREIGN PATENT DOCUMENTS

| | | |
|---|---|---|
| CN | 104837094 A | 8/2015 |
| EP | 1469659 A1 | 10/2004 |
| EP | 1017252 A3 | 5/2006 |
| EP | 2903186 A1 | 8/2015 |
| GB | 2074817 | 4/1981 |
| GB | 2508226 A | 5/2014 |
| JP | 06292195 | 10/1998 |
| WO | 2008103925 A1 | 8/2008 |
| WO | 2008113053 A1 | 9/2008 |
| WO | 2007034371 A3 | 11/2008 |
| WO | 2011001433 A2 | 1/2011 |
| WO | 2012071127 A1 | 5/2012 |
| WO | 2013134956 A1 | 9/2013 |
| WO | 2014046602 A1 | 3/2014 |
| WO | 2014043179 A3 | 7/2014 |
| WO | 2015061633 A2 | 4/2015 |
| WO | 2015110577 A1 | 7/2015 |
| WO | 2015110587 A1 | 7/2015 |
| WO | 2016032990 A1 | 3/2016 |
| WO | 2016187869 A1 | 12/2016 |

OTHER PUBLICATIONS

Alzahrani et al: "A Multi-Channel Opto-Electronic Sensor to Accurately Monitor Heart Rate against Motion Artefact during Exercise", Sensors, vol. 15, No. 10, Oct. 12, 2015, pp. 25681-25702, XPO55334602, DOI: 10.3390/s151025681 the whole document.
Announcing the $3,333,333 Stretch Goal (Feb. 24, 2014).
Ben Coxworth: "Graphene-based ink could enable low-cost, foldable electronics", "Journal of Physical Chemistry Letters", Northwestern University, (May 22, 2013).
Blain: "World's first graphene speaker already superior to Sennheiser MX400", htt://www.gizmag.com/graphene-speaker-beats-sennheiser-mx400/31660, (Apr. 15, 2014).
BMW, "BMW introduces BMW Connected—The personalized digital assistant", "http://bmwblog.com/2016/01/05/bmw-introduces-bmw-connected-the-personalized-digital-assistant", (Jan. 5, 2016).
BRAGI Is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, A Lot to Be Done Over Christmas (Dec. 22, 2014).
BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People © BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing—Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, On Track(May 16, 2015).
BRAGI Update—Beta2 Production and Factory Line(Aug. 20, 2015).
BRAGI Update—Certifications, Production, Ramping Up.
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2015).
BRAGI Update—On Track, Design Verification, How It Works and What's Next(Jul. 15, 2015).
BRAGI Update—On Track, On Track and Gems Overview.
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Healthcare Risk Management Review, "Nuance updates computer-assisted physician documentation solution" (Oct. 20, 2016).
Hoffman, "How to Use Android Beam to Wirelessly Transfer Content Between Devices", (Feb. 22, 2013).
Hoyt et. al., "Lessons Learned from Implementation of Voice Recognition for Documentation in the Military Electronic Health Record System", The American Health Information Management Association (2017).
Hyundai Motor America, "Hyundai Motor Company Introduces a Health + Mobility Concept for Wellness in Mobility", Fountain Valley, California (2017).
International Search Report & Written Opinion, PCT/EP16/70245 (dated Nov. 16, 2016).
International Search Report & Written Opinion, PCT/EP2016/070231 (dated Nov. 18, 2016).
International Search Report & Written Opinion, PCT/EP2016/070247 (dated Nov. 18, 2016).
Jain A et al: "Score normalization in multimodal biometric systems", Pattern Recognition, Elsevier, GB, vol. 38, No. 12, Dec. 31, 2005, pp. 2270-2285, XPO27610849, ISSN: 0031-3203.
Last Push Before The Kickstarter Campaign Ends on Monday 4pm CET (Mar. 28, 2014).
Nemanja Paunovic et al, "A methodology for testing complex professional electronic systems", Serbian Journal of Electrical Engineering, vol. 9, No. 1, Feb. 1, 2012, pp. 71-80, XPO55317584, YU.
Nigel Whitfield: "Fake tape detectors, 'from the stands' footie and UGH? Internet of Things in my set-top box"; http://www.theregister.co.uk/2014/09/24/ibc_round_up_object_audio_dlna _iot/ (Sep. 24, 2014).
Nuance, "ING Netherlands Launches Voice Biometrics Payment System in the Mobile Banking App Powered by Nuance", "https://

(56) References Cited

OTHER PUBLICATIONS www.nuance.com/about-us/newsroom/press-releases/ing-netherlands-launches-nuance-voice-biometrics.html", 4 pages (Jul. 28, 2015).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for The Dash (Feb. 12, 2014).
Stretchgoal—Windows Phone Support (Feb. 17, 2014).
The Dash + The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).
Wertzner et al., "Analysis of fundamental frequency, jitter, shimmer and vocal intensity in children with phonological disorders", V. 71, n.5, 582-588, Sep./Oct. 2005; Brazilian Journal of Othrhinolaryngology.
Wikipedia, "Gamebook", https://en.wikipedia.org/wiki/Gamebook, Sep. 3, 2017, 5 pages.
Wikipedia, "Kinect", "https://en.wikipedia.org/wiki/Kinect", 18 pages, (Sep. 9, 2017).
Wikipedia, "Wii Balance Board", "https://en.wikipedia.org/wiki/Wii_Balance_Board", 3 pages, (Jul. 20, 2017).

\* cited by examiner

WIRELESS EARPIECE WITH WALKIE-TALKIE FUNCTIONALITY

PRIORITY STATEMENT

This application claims priority to U.S. Provisional Patent Application No. 62/416,979 filed on Nov. 3, 2016, titled Wireless Earpiece with Walkie-Talkie all of which is hereby incorporated by reference in entirety.

FIELD OF THE INVENTION

The illustrative embodiments relate to electronic devices. Particularly, embodiments of the present invention relate to wearable electronic devices. More particularly, but not exclusively, the illustrative embodiments relate to wireless earpieces.

BACKGROUND

The Push-to-Talk over Cellular (PoC) Standard of the Open Mobile Alliance™ supports a push-to-talk communication between participating cellular telephones supporting the PoC standard. As is well-known, the Push-to-Talk standard allows a walkie-talkie type half-duplex communication to be carried out between registered users.

Typically, a transmitting telephone device has an address book containing telephone numbers of contacts with whom a session may be established. An initiator selects a recipient from the address book and a push-button is depressed, whereupon a half-duplex communication session can be established with the selected recipient. The recipient is alerted, typically by a characteristic tone informing him the incoming call is a Push-to-Talk call. The recipient may depress an accept-call button, whereby (s)he will be able to hear the initiator, but without the ability to reply until the initiator ceases speaking and lifts his finger from the push-button.

If the recipient is equipped with a PoC-compatible device, (s)he may at this stage depress a similar push-button on her/his device so as to establish a walkie-talkie type communication with the initiator. If the recipient is not equipped with a PoC-compatible device, then no service can be provided and in such a case a tone indicating failure will be heard on the initiator device. Further, the user necessarily must press a button to talk, which can be intrusive on several levels, such as the need to reach for the phone, wherever it should be, and the need to constantly physically depress a button when desiring to communicate in a walkie-talkie and/or hand-held two-way radio conversation.

Mobile telephones having integral cameras are becoming popular. These telephones allow still video images to be captured and communicated to remote users, both over the cellular network and, of course, over the Internet. However, walkie-talkies as they are currently known do not support cameras and/or video.

Wearable electronic device technology is intended to be used frequently while a user is active (e.g., walking, driving, sports, sleeping, skiing, etc.). Conventional wearable electronic device user interfaces (e.g., a mouse, touch interfaces, voice commands, etc.) may be difficult and/or impractical (e.g., double tapping a touch interface on a head-worn device while running, or talking while out-of-breath in a windy environment, etc.) when a user is performing tasks limiting their ability to use the electronic device. In this context conventional user interfaces can be ungainly and make the wearable electronic device useless or have diminished capacity during specific movement events.

Wireless earpieces are a new class of consumer electronic devices with excellent growth potential. Wireless earpieces have focused on personal entertainment and communications. For example, wireless earpieces may be utilized with a cellular phone to make phone calls. Thus far, wireless devices have not efficiently facilitated communications between multiple potential users in a two-way radio capacity.

SUMMARY

Therefore, it is a primary object, feature, or advantage of the present invention to improve over the state of the art.

It is a further object, feature, or advantage of the present invention to allow a user of a wearable such as an earpiece wearable to connect and talk with other users of earpiece wearables.

It is a still further object, feature, or advantage of the present invention to allow a user of a wearable such as an earpiece wearable to identify users in proximity with the user and to invite or accept invitations from other users to talk.

Another object, feature, or advantage is to provide a walkie-talkie like function to allow a user of an earpiece wearable to indicate when they wish to activate a message without the user needing to use their hands to do so.

Yet another object, feature, or advantage is to provide for audio message that does not require a user to use a display in order to send and receive messages.

A further object, feature, or advantage it to reproduce audio messages in 3D from a perspective of a receiver of the audio message such that, for example, relative locations of other users who are messaging the user may be communicated.

A still further object, feature, or advantage is to provide users with the ability to relive an event associated with audio messaging by storing the audio message, constructing a chat log of the audio message by converting the audio messages from speech to text, and to synchronize additional content with the audio messages including images, video, sensor data, or otherwise.

One or more of these and/or other objects, features, or advantages of the present invention will become apparent from the specification and claims follow. No single embodiment need provide each and every object, feature, or advantage. Different embodiments may have different objects, features, or advantages. Therefore, the present invention is not to be limited to or by any objects, features, or advantages stated herein.

According to one aspect, a method of audio messaging between users of earpiece wearables is provided. The method includes connecting an earpiece wearable associated with a first user with an earpiece wearable associated with a second user and sending and receiving audio messages between the earpiece wearable associated with the first user and the earpiece wearable associated with the second user, wherein the sending of the audio messages is activated by head movement sensed with an inertial sensor of the earpiece wearable performing the sending. The method further includes maintaining a record of the audio messages stored on a machine readable memory. The machine readable memory may be on one of the earpiece wearables, all of the earpiece wearables, on a mobile device or other computing device operatively connected to one or more of the earpiece wearables, or may be in cloud storage. The method may further include connecting the earpiece wearable associated with the first user and the earpiece wearable associated with the second user with an earpiece wearable associated with a third user. The method may further include connecting the earpiece wearable associated with the first user with a mobile device associated with the first user, the mobile device having a display, and presenting a visual display on the mobile display listing one or more users for audio messaging, the one or more users for audio messaging including the second user. The one or more users may be located proximate to the first user. The second user and the first user may be within a group and wherein the listing of the one or more users for audio messaging may include listing one or more groups. The method may further include sending a request from the first user to the second user for audio messaging and receiving an acceptance of the request from the second user to the first user. The earpiece wearable associated with the first user earpiece processes audio messages from the earpiece wearable associated with the second user in order to provide 3D sound representation of the audio messages from the earpiece wearable associated with the second user. The earpiece wearable associated with the first user earpiece processes audio messages from the earpiece wearable associated with the second user in order to provide 3D sound representation of the audio messages from the earpiece wearable associated with the second user based on relative location of the second user to the first user. The method may further include connecting the earpiece wearable associated with the first user with a mobile device associated with the first user, the mobile device having a display, and presenting a visual display on the mobile display including a map showing the relative location of the second user to the first user. The method may further include performing a speech to text conversion of the audio messages to generate a chat log between the users of the earpiece wearables. The method may further include synchronizing the chat log with additional content. The additional content may include imagery such as still imagery or video imagery. The additional content may include data collected by the earpiece wearable contemporaneously with the audio messaging. The earpiece wearable may include a left earpiece and a right earpiece, each of the left earpiece and the right earpiece may have at least one microphone and at least one speaker.

According to another aspect, a method of audio messaging between users of earpiece wearables is provided. The method includes connecting an earpiece wearable associated with a first user with an earpiece wearable associated with a second user, sending and receiving audio messages between the earpiece wearable associated with the first user and the earpiece wearable associated with the second user, wherein the sending of the audio messages is activated by a gesture sensed by the earpiece wearable performing the sending, and maintaining a record of the audio messages stored on a machine readable memory. The gesture may be a head movement sensed by an inertial sensor of the earpiece wearable performing the sending. The gesture may be a hand movement sensed by a gestural interface of the earpiece wearable performing the sending.

BRIEF DESCRIPTION OF THE DRAWINGS

Illustrated embodiments of the disclosure are described in detail below with reference to the attached drawing figures, which are incorporated by reference herein.

DETAILED DESCRIPTION

Figure 1:
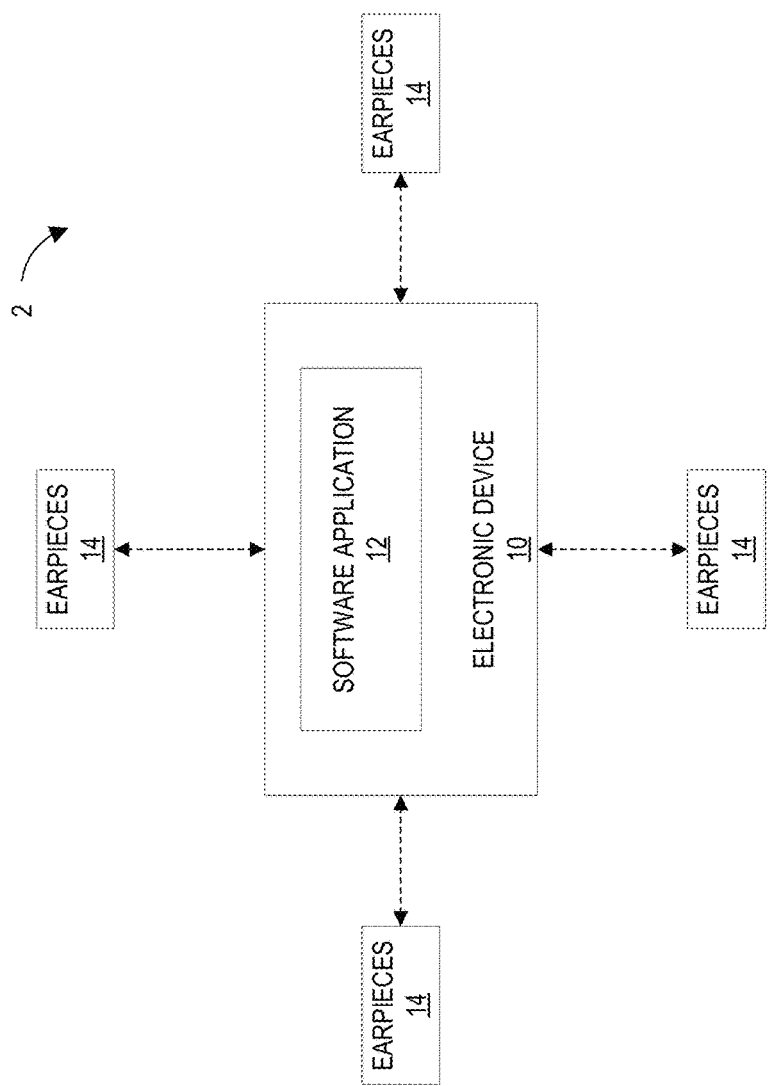
FIG. 1 illustrates a block diagram of the system in accordance with embodiments of the present invention.

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings. While embodiments of the present invention are discussed in terms of wireless earpieces with walkie-talkie functionality, it is fully contemplated embodiments of the present invention could be used in most any electronic communications device without departing from the spirit of the invention.

It is an object, feature, or advantage of the illustrative embodiments to facilitate direct communication between wireless earpiece users. It is a still a further object, feature, or advantage of the illustrative embodiments to allow wireless earpiece users to communicate with one or more additional wireless earpiece users while wearing one or more wireless earpieces. Another object, feature, or advantage is to allow for automatic connection with another wireless earpiece user if a wireless earpiece wearer is in close proximity with another wireless earpiece wearer. Yet another object, feature, or advantage is to provide for the streaming of visual media recorded on another electronic device along with sound from a wireless earpiece to a user of an electronic device having visual media playback capability. In one embodiment, a system includes at least one wireless earpiece worn in an ear of a user. A software application, executable on an electronic device, is programmed to transmit a communications request in response to a kinetic action by a user to one or more wireless earpieces. The software then connects to another one or more users when the user issues a kinetic action or a gesture sensed by the wireless earpiece of one or more users.

One or more of the following features may be included. An electronic device may be a mobile phone, a tablet, a laptop, a desktop computer, an eyepiece and a watch. The electronic device may include a screen element and a user interface coupled with the screen element. The software application may instruct the screen element to display one or more users in response to a command by the user. One or more users may be organized into a group by the software application. The user may communicate an invitation message to one or more wireless earpieces. The kinetic action and/or gesture may be a head gesture. The communications may be encoded. The software application may instruct the screen element to display a temporally continuous transcription of communications received from one or more wireless earpieces. The communications may further include visual media. The software application may instruct the screen element to display the visual media received from one or more users. The software application may synchronize the temporally continuous transcription with the visual media for display on the screen element.

In another embodiment, a method of establishing a connection to one or more wireless earpieces using an electronic device includes selecting one or more users on a screen element of an electronic device. A communication request is communicated to one or more users to establish the connection with the wireless earpiece. Commencing communication with one or more users via the connection in response to acceptance of the communication request by at least one user via one or more wireless earpieces.

One or more of the following features may be included. The electronic device may be selected from a group consisting of a mobile phone, a tablet, a laptop, a desktop computer, an eyepiece, a second wireless earpiece, and a watch. The communication request may be automatically initiated to one or more users if one or more of those users are proximate to a user. The location of each user may be displayed via the screen element. The communication may be communicated in a three-dimensional manner. The speech-to-text chat log derived from the communication may be displayed via the screen element. Visual media may be received from one or more users. The visual media and the speech-to-text chat log may be synchronized. The synchronized visual media and speech-to-text chat log may be displayed via the screen element.

In another embodiment, a method of connecting to a user having a wireless earpiece includes receiving a communication request at the wireless earpiece from a user having an electronic device, and accepting the communication request from the electronic device user. The communication request is accepted using a kinetic action and/or gesture, which is sensed by the wireless earpiece.

One or more of the following features may be included. The electronic device may be a mobile phone, a tablet, a laptop, a desktop computer, an eyepiece, a second wireless earpiece, and a watch. The kinetic action and/or gesture may be a head gesture. An additional communication request from a second electronic device may be received. The additional communication may be accepted using a second kinetic action and/or gesture sensed by the wireless earpiece. The second kinetic action and/or gesture may be a head gesture. The second electronic device may be worn by a user and operatively connected to the wireless earpiece. The second electronic device may be configured to record visual media. The visual media recorded by the second electronic device may be communicated to the user.

The illustrative embodiments provide a system, method and wireless earpiece(s) for performing real-time communications. In one embodiment, the wireless earpieces may be utilized to directly or indirectly communicate in walkie-talkie, two-way radio or real time communications with other wireless earpieces or electronic devices. An application executed by the wireless earpieces or an associated wireless device may control the contacts and any confirmations, responses or authorizations required to perform initial or ongoing communications. Any number of audio, visual, or tactile alerts, indicators, or alarms may be utilized to indicate communications are sent, received, in transmission, being received, or so forth.

FIG. 1 illustrates a block diagram of a system 2 including an electronic device 10, a software application 12 executable on the electronic device 10 and one or more wireless earpieces or earpiece wearables 14 worn by one or more users. The earpiece wearables or wireless earpiece(s) 14 may reference a set of wireless earpieces or a left wireless earpiece individually or a right wireless earpiece individually. References herein to earpiece wearables, an earpiece wearable, wireless earpieces or a wireless earpiece may refer to a set of wireless earpieces or earpiece wearables and/or a wireless earpiece or earpiece wearable individually. In one embodiment, the electronic device 10 may represent a mobile phone, a tablet, a laptop, a desktop computer, a wireless earpiece, a watch, or any other type of electronic device capable of both receiving a user input and interacting with outside electronic devices.

The software application 12 executable on the electronic device 10 may be either stored on the electronic device 10 or may be directly accessible from an outside or user electronic device, such as a server, a communications tower, a portable memory device or a computing device such a tablet, a desktop computer or a laptop and only a portion of the software application 12 may be executed on the electronic device 10 in order to function. The software application 12 may be programmed to transmit a communication request to one or more wireless earpieces 14 in response to an action taken by a user of the electronic device 10 to establish a connection.

The communication request may be directed to one or more wireless earpieces 14 or may be communicated through one or more intermediary electronic devices, such as a router, repeater, communications tower, a satellite, a server, or another computing device capable of receiving radio frequency, electromagnetic or other wireless signals before reaching a wireless earpiece 14. The communication request may be directed to additional wireless earpieces or even other types of electronic devices used, worn, or carried by a user or users.

In one embodiment, the connection to the electronic device 10 initiated by the software application 12 may be established in response to a gesture from a user sensed by the wireless earpieces 14 associated with the user. More than one user wearing a wireless earpiece 14 may establish a connection to the electronic device 10, and other types of electronic devices, such as mobile phones, tablets, laptops, desktop computers, smart glasses, smart jewelry, eyepieces, and watches.

Kinetic actions and/or gestures may be used with the wireless earpiece 14 to establish a link including head gestures, hand gestures, finger gestures, tapping gestures, swiping gestures or any sort of tactile input or gesture sensed by the wireless earpiece 14, and more than one type of gesture may be used. In another embodiment, the wireless earpiece 14 may receive verbal or audio commands to implement an action. Visual, audio, or other media recorded or stored by a second electronic device, such as a smartphone, a camcorder, a digital camera or electronic eyewear, operatively connected to one or more wireless earpieces 14 worn by one or more users, may be communicated by one or more users wearing the wireless earpieces 14 or the electronic device 10.

In one embodiment, the wireless earpieces 14 may be separated to perform communications with each other (e.g., a left wireless earpiece given to a first user and a right wireless earpiece given to a second user). The wireless earpieces 14 may communicate utilizing any number of standards, protocols, or signals. The utilization of the wireless earpieces 14 may allow a user to create an impromptu walkie-talkie system utilizing the wireless earpieces 14 without additional devices being required or necessary. In one embodiment, the electronic device 10 may be utilized as a repeater, booster, node, ranger extender or intermediary for relaying communications between the wireless earpieces 14. The wireless earpieces 14 may be utilized for sporting events or competitions, work environments, team exercises, organizations, military units, emergency responders and so forth.

Figure 2:
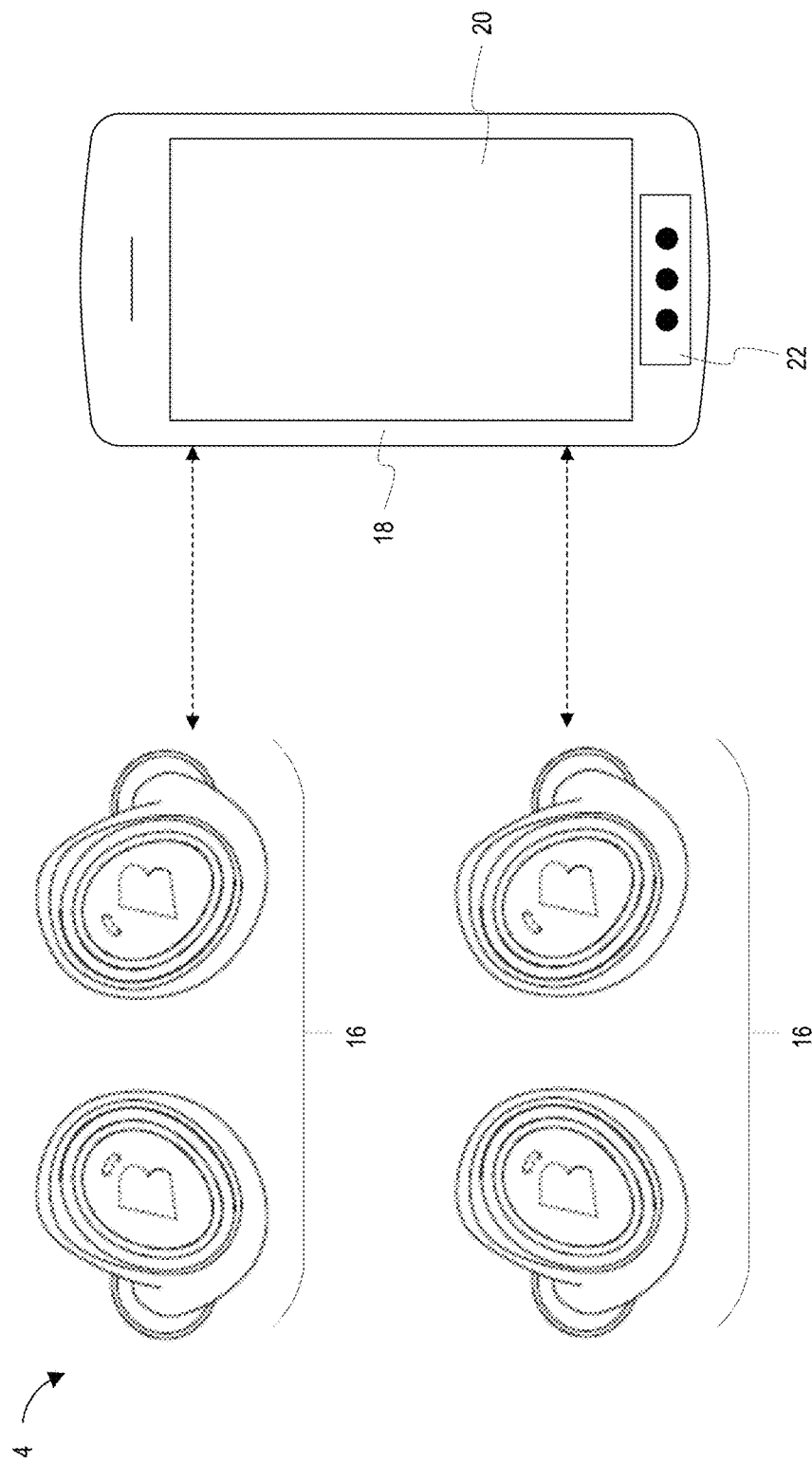
FIG. 2 illustrates a pictorial representation in accordance with embodiments of the present invention.

FIG. 2 illustrates one embodiment of a system 4. In one embodiment, the system 4 may include one or more pairs of wireless earpieces 16 and a mobile phone 18 having a screen 20 and a user interface 22. The wireless earpieces 16 may be worn by a first user or another user the first user wishes to communicate with. As shown multiple pairs of wireless earpieces 16 may be utilized with the system 4. The screen 20 of the mobile phone 18 may display one or more users, device identifier, nicknames or other identifiers the user is currently connected to, communicated with in the past or may wish to connect with. The screen 20 may also display other media or functions connected with the software application 12 or may display media or functions related to other applications. The user interface 22 located on the mobile phone 18 may be used to select a person, device or user the first user wishes to speak with, disconnect from, or remove a person, device or user from a list the first user no longer wishes to communicate with in the future. The user interface 22 may also be used to perform other functions related to the software application 12, another application unrelated to the software application or another function of the mobile device 18. It may also be appreciated the user interface 22 may also be located and/or be a part of the screen element 20 as well.

Figure 3:
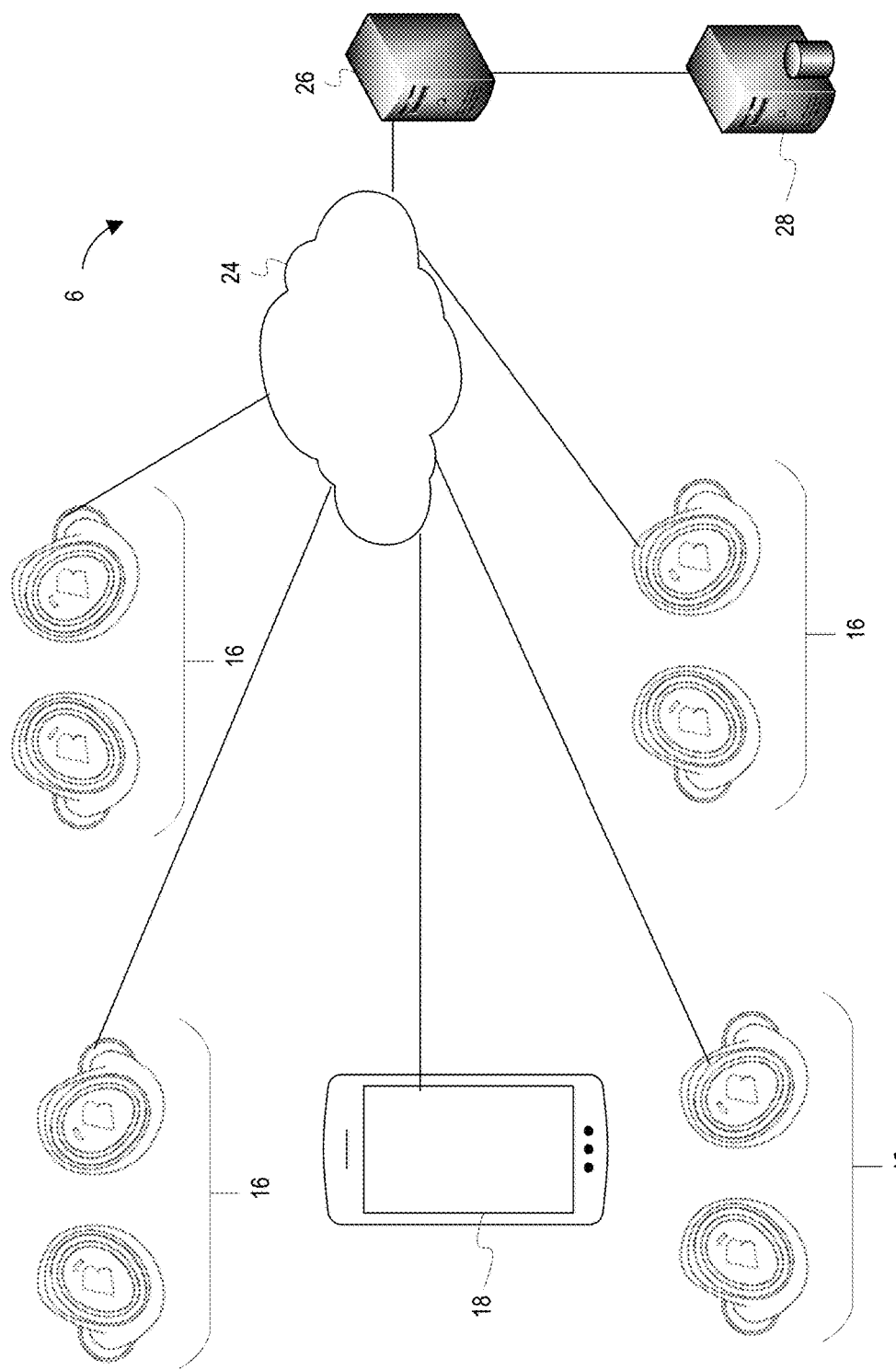
FIG. 3 illustrates a system in accordance with embodiments of the present invention.

FIG. 3 illustrates another embodiment of a system 6 including at least one mobile phone 18, one or more sets of wireless earpieces 16, a network 24, a server platform 26 and a database server 28. Communication requests submitted via the mobile phone 18 may be transmitted to a network 24, which may subsequently retransmit the communication request to one or more wireless earpieces 16 or a server platform 26. Transmissions other than communication requests may also be transmitted to the network 24 and subsequently transmitted to one or more wireless earpiece 16, electronic devices other than wireless earpiece 16 or the server platform 26.

In addition, requests or other transmissions may also be communicated or transmitted by a user or another/secondary user to the network 24 using a wireless earpiece 16 or another electronic device (e.g. a mobile phone 18 or a tablet). Communications and transmissions received by the server platform 26 may be further transmitted to a database server 28 to be analyzed, processed or stored for future use. For example, communications or transmissions encoding user or biometric information received by the server platform 26 may be compared to information in the database server 28 to verify identity before communicating or transmitting a request or a reply to the user or an alternate user.

In addition, information encoded in communications or transmissions received by the server platform 26 may be compared to data or information in the database server 28 to assist in verifying or authenticating the identity of users, provide location-dependent services to the user or users, develop a detailed profile of the user or user or assist advertisers in targeting advertisements to the user or users. Assistance with operating the wireless earpiece 16 may also be communicated to one or more wireless earpiece(s) 16 if it is determined by the server platform 26 the user is having difficulty using one or more wireless earpieces 16 or if one or more functionalities of one or more wireless earpieces 16 is not operating within normal parameters. In addition, media such as music, fitness programs, news or weather reports, podcasts or advertisements may be stored in the server platform 26 or database server 28 and communicated to the user and/or alternate/secondary user's wireless earpiece 16 if desired.

Figure 4:
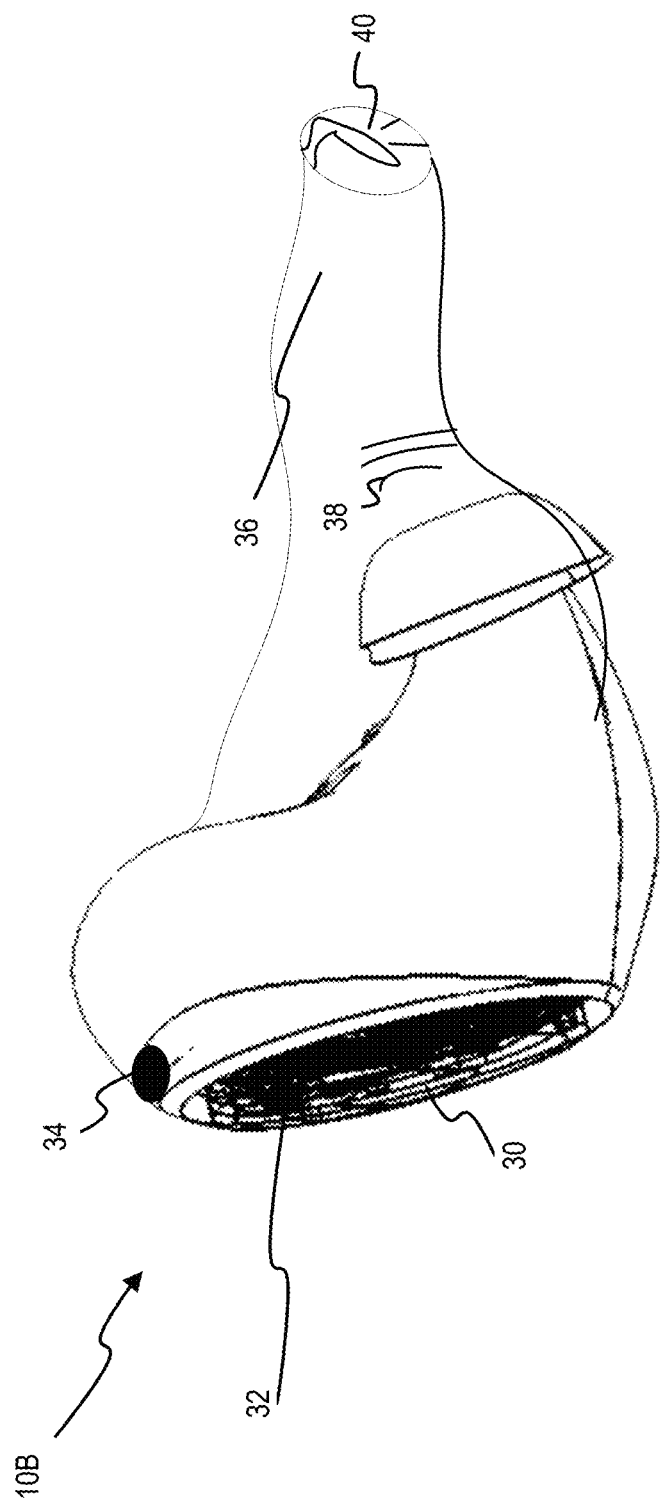
FIG. 4 illustrates a right wireless earpiece of a wireless earpiece set in accordance with embodiments of the present invention.

FIG. 4 illustrates a right wireless earpiece 10B of a wireless earpiece set 16 as it relates to a user's or alternate/secondary user's right ear. The user or alternate/secondary user may interact with the right wireless earpiece 10B by either providing a kinetic action or gesture sensed by a gesture interface 30, a voice command sensed via a microphone 32, or by one or more head or neck motions which may be sensed by an inertial sensor 34 such as a MEMS gyroscope, magnetometer or an electronic accelerometer. In one embodiment, the gesture interface 30 may include one or more optical sensors, touch/capacitive sensors or so forth. The microphone 32 may represent one or more over-air or bone conduction microphones. The air-based microphone may be positioned on an exterior of the right wireless earpiece 10B when worn by the user. The bone conduction microphone may be positioned on an interior portion of the right wireless earpiece 10B to abut the skin, tissues and bones of the user.

For example, if a first user wearing the right wireless earpiece 10B receives an invitation to establish a connection from a second user, where a connection may already be established between the first user and one or more alternate/secondary users, the first user receiving the invitation may accept the invitation by nodding his head. The head nod may be sensed by the inertial sensor 34, such as an electronic accelerometer, via voltage changes due to capacitance differentials caused by the nodding of the head. In addition, the first user may tap on or swipe across the gesture interface 30 to bring up a menu in which to send, for example, a preprogrammed reply or one or more pieces of media the first user wishes to share with the second user and/or one or more other users currently connected to the first user.

The user may also wish to control which users receive a communication or transmission by accessing a second menu via an additional gesture, such as a voice command or a finger swipe, to determine which users are currently connected to the user. The user may subsequently select one or more specific users in which to communicate. The user may also communicate with other users connected to the user via the microphone 32. The right wireless earpiece 10B may be positioned within the ear canal 36 to minimize the distance between the right wireless earpiece 10B and the user's tympanic membrane 40 so any sound communications 38 received by the user are effectively communicated to the user using the right wireless earpiece 10B.

Figure 5:
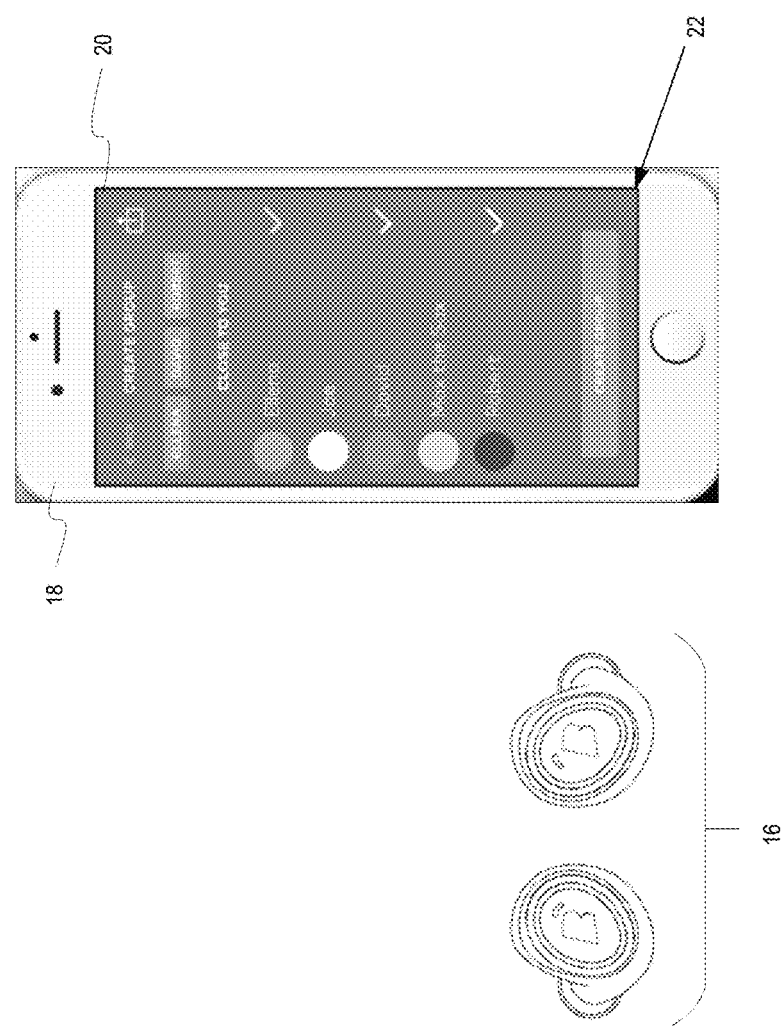
FIG. 5 illustrates a mobile phone having a screen element and a user interface in accordance with embodiments of the present invention.

FIG. 5 is an illustration of a mobile phone 18 having a screen 20 and a user interface 22 showing users the user of the mobile phone 18 may connect to. Users the user wishes to communicate with may be selected using the user interface 22 or by tapping on the appropriate user on the screen 20. The users may be organized into one or more groups using the user interface 22 or by tapping, swiping or touching the appropriate area corresponding to the user on the screen 20. Once one or more users are selected, the user of the mobile phone 18 may communicate a request to all members of the created group simultaneously. Users establishing a connection may be signified by a check mark or another recognizable signifier.

The users may be shown using names, nicknames, avatars, pictures, images, icons or other identifiers. The screen 20 may be a touch screen allowing the different interactive components (e.g., avatars, icons, buttons, scroll wheels, drop down menus, etc.) to be selected, dragged, dropped or so forth.

Figure 6:
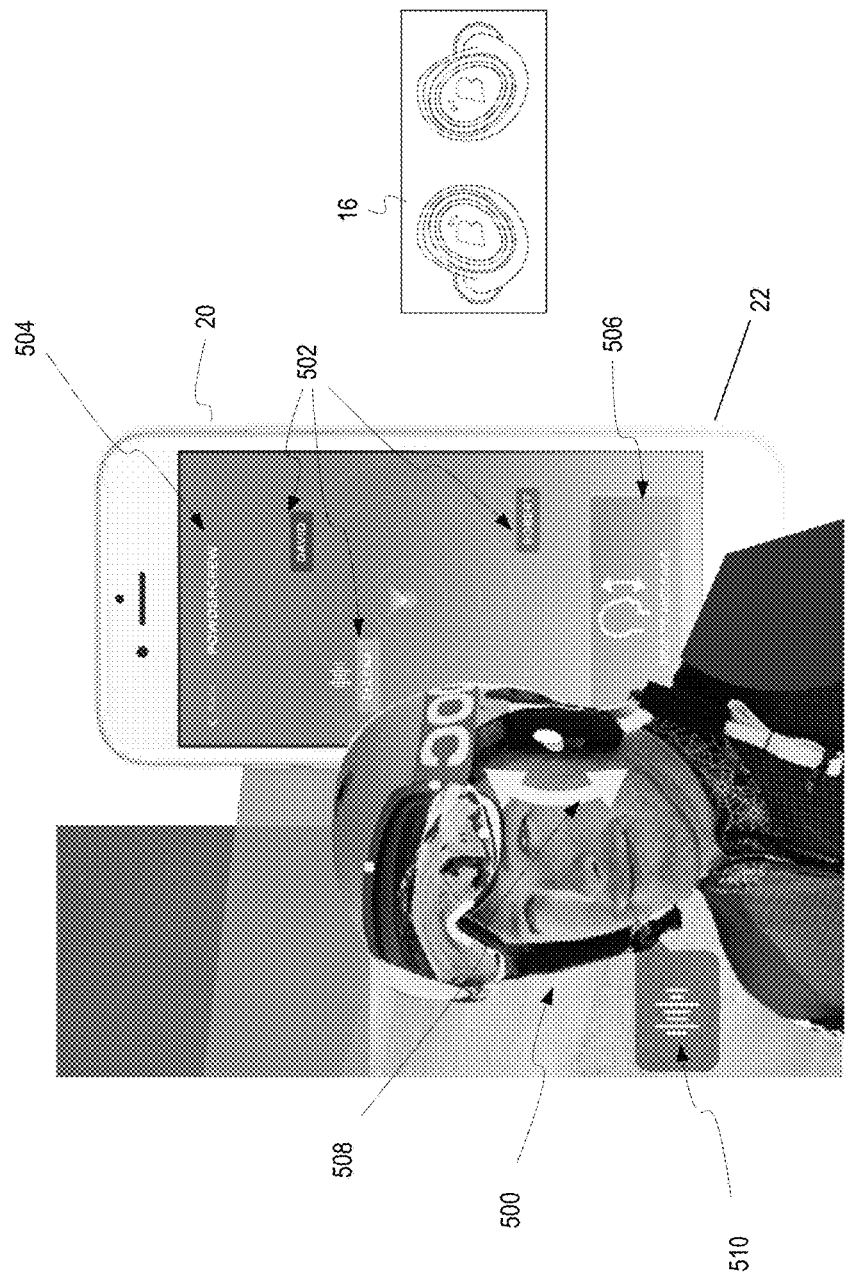
FIG. 6 illustrates another embodiment of a mobile phone having a screen element and a user interface in accordance with embodiments of the present invention.

FIG. 6 is an illustration of a mobile phone 18 having a screen 20 showing the location of potential alternate/secondary users 502 whom a connection can be established with the user 500 via a wireless earpiece 16 worn by the alternate/secondary users 502. Alternate/secondary users 502 may show up on the screen 20 when the alternate/secondary users 502 are within a certain proximity to the user 500 or mobile phone 18 and may automatically establish a connection to the mobile phone 18 depending on the settings of the mobile phone 18 and/or the wireless earpiece 16 worn by the alternate/secondary users 502 on the screen 20. Settings or a user profile automatically connecting to one or more wireless earpiece 16 or alternate/secondary users 502 near the user 500 or mobile phone 18 may be accessed using the user interface 22 or by touching, tapping, or swiping an appropriate area on the screen 20.

The wireless earpieces 16 or the mobile phone 18 may store any number of contacts as favorites, groups, speed dial or designated contacts for quick, easy or efficient communications including discrete voice communications (e.g., walkie-talkie), discrete media communications, text messaging or so forth. Any number of signal, packet or message formats may be utilized by the wireless earpieces 16 or the mobile phone 18.

In one embodiment, the wireless earpieces 16 may detect a direct connection with one or more sets or individual wireless earpieces 16. The wireless earpieces 16 may communicate directly with the other wireless earpieces 16 utilizing a standard or proprietary communications signal, protocol, or link. For example, signals, such as Bluetooth, Wi-Fi, cellular signals, or so forth may be utilized. However, any number of other radiofrequency or optical signals may be utilized to perform communications. The wireless earpieces 16 may also communicate through multiple networks (e.g., local area networks, cellular networks, open networks, proprietary or secure networks, the Internet, etc.).

With further reference to FIG. 6, it is shown on screen 20 of mobile device 18, user 500 has chosen a group of alternate/secondary users 502 he has pre-labeled and stored as the "POWDERCREW" 504. The POWEDERCREW group 504 is but one example of user 500 placing alternate/secondary users 502 into groups of users for efficiency of use and connectivity. As can be further seen on screen 20, user 500 has been prompted to nod his head (instruction box 506) in order to initiate a message (e.g., verbal, text, video or otherwise) to the POWDERCREW 504. User 500 can then nod his head 508 and initiate conversation, texts messages and/or other instructions, such as sending a video, through voice instructions 510.

Figure 7:
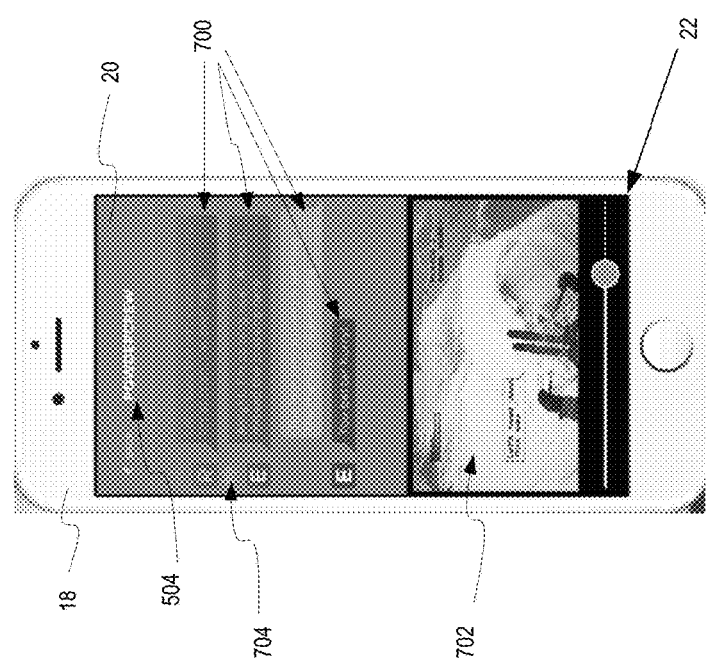
FIG. 7 illustrates another embodiment of a mobile phone having a screen element and a user interface in accordance with embodiments of the present invention.

FIG. 7 is an illustration of a mobile phone 18 having a screen 20 and a user interface 22 showing a transcription of communications shared by the user 500 and one or more users 502 connected to the mobile phone 18 (or the wireless earpieces 16). Transcription log 700 may be displayed continuously as communications are being communicated. The transcription 700 may also be displayed with a time delay. Visual media 702 recorded by one or more users 502 using a second electronic device capable or recording visual media 702, such as a smartphone, a digital camcorder, a digital camera, or an electronic eyepiece, may be communicated to the mobile phone 18 by one or more users 502. Sounds 704 received by the wireless earpieces 16 worn by alternative/secondary users 502 or audio stored or received by one or more second electronic devices may also be communicated to the mobile phone 18. The user 500 may use the user interface 22 or interact with an appropriate choice displayed on the screen 20 to change or adjust one or more settings, such as the volume, contrast, brightness, tint, or resolution, of any visual media played back by the mobile phone 18. The user interface 22 may also be utilized to make similar changes to the wireless earpieces 16 (e.g., volume, display settings, language utilized, biometric readings, user profile utilized, transcription settings, translation, auto answer, audio pass-through/audio transparency, etc.).

Figure 8:
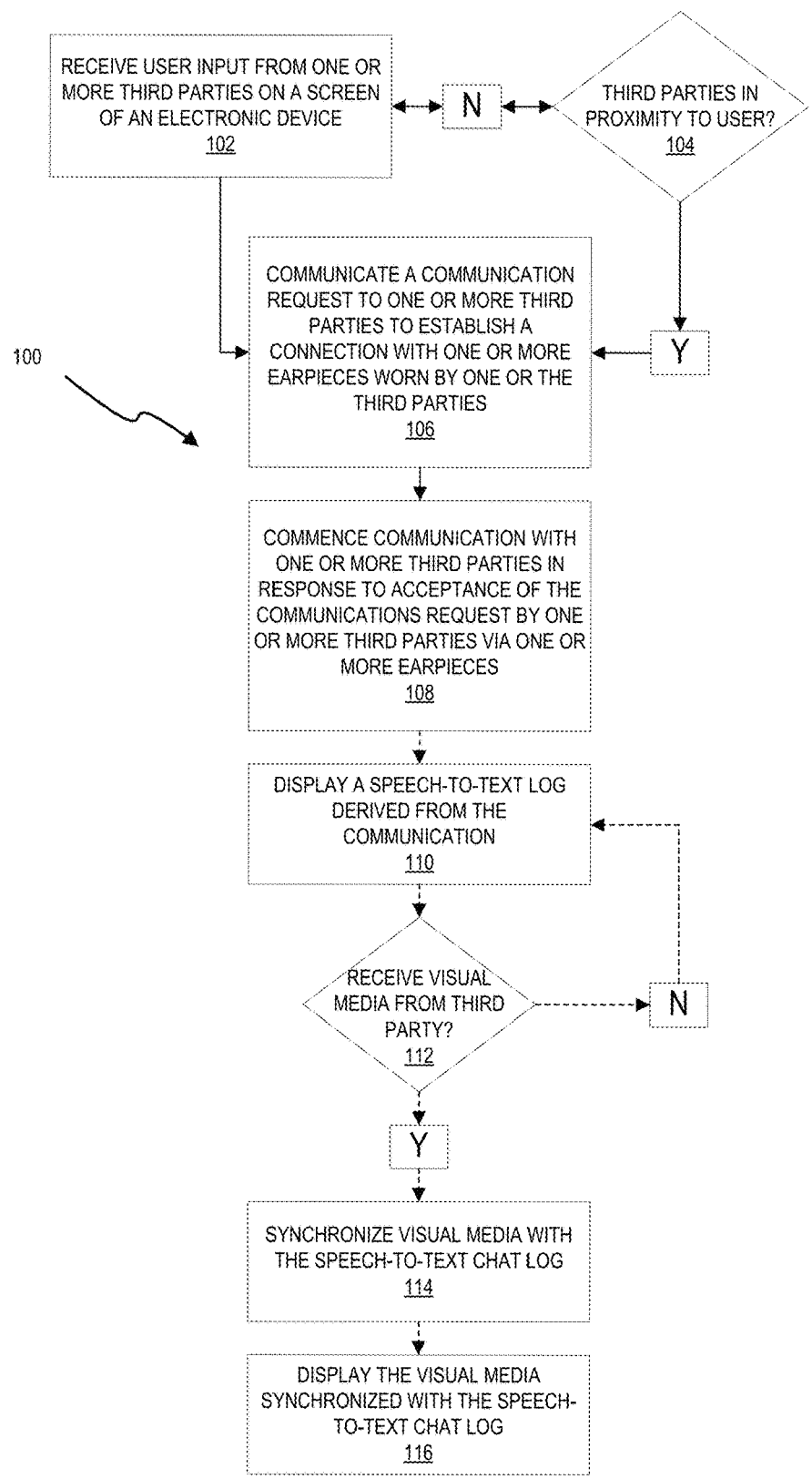
FIG. 8 illustrates a flowchart of a method a method of establishing a connection to at least one wireless earpiece using an electronic device in accordance with embodiments of the present invention.

FIG. 8 is a flowchart of a method of establishing a connection to one or more wireless earpieces using an electronic device 100. First, in step 102, user input is received selecting one or more users 502 on a screen 20 of an electronic device 18. The electronic device 18 may be a mobile phone, a tablet, a laptop, a desktop computer, a watch, an eyepiece or any other electronic device having a screen. The selection may be performed on the screen itself based on an executed application with a corresponding graphical user interface via one or more touches, taps, or swipes or via a separate user interface on the electronic device itself 18.

After selecting one or more users 502, or if one or more users 502 are proximate to the user 500 or electronic device 18 in step 104, then in step 106, a communication request is communicated to one or more users 502 either selected by the user 500 or within close proximity to the user 500. The communication may be performed immediately after the selection of the user(s) 502 or an additional prompt may be required to initiate the communication request.

If one or more users 502 accepts the communication request via a wireless earpiece 16 worn by the users 502, then in step 108, communications are commenced with each user 502 accepting the communication request. The acceptance of the communication request may be performed at a time substantially later than the communication of the communication request, such as when the communication request is delayed in getting to a user, and a notification such as a sound, alert, alarm, indicator or a signifier like a pop-up alert, check mark, message or icon displayed on the screen element may be communicated to the user 500 when a user 502 has accepted the communication request.

In step 110, a speech-to-text log derived from communication between the user 500 and one or more users 502 may be displayed on the screen 20. The transcription log 700 may be displayed contemporaneously with the communication between the user 500 and one or more users 502 or displayed with a time delay. The wireless earpieces 16 or smart device 18, such as a mobile phone, tablet, cloud system, servers, or so forth may perform the transcription in real-time or near real-time.

In addition, if visual media 702 is received from the user 500 in step 112, then in step 114, the transcription log 700 may be synchronized with the visual media 702, which may then be displayed in step 116. The visual media 702 may either be a video received from one or more users 502 or a video captured by another electronic device such as a camcorder, a smartphone, or a digital camera operatively connected to a wireless earpiece 16 worn by the user 500 and communicated to the electronic device 18.

Figure 9:
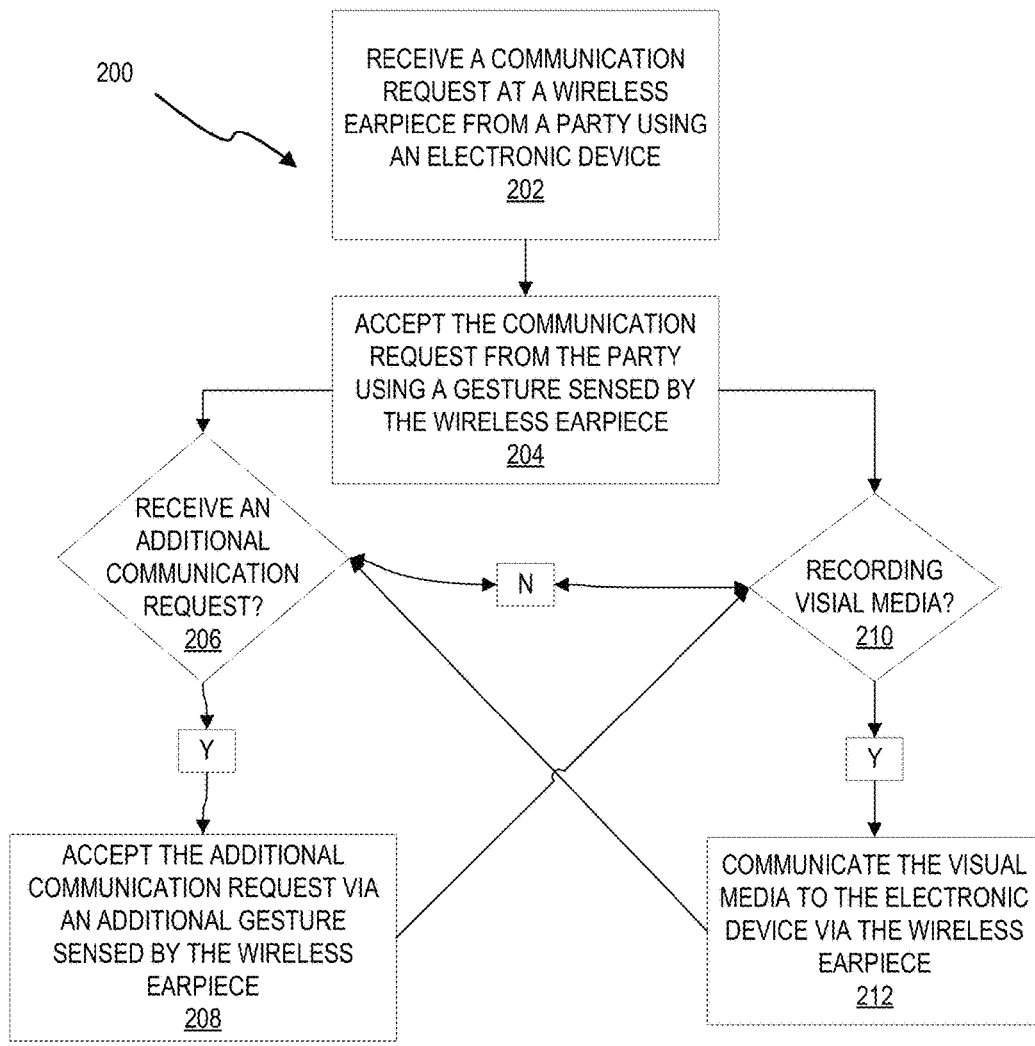
FIG. 9 illustrates a flowchart of a method of connecting to a user using a wireless earpiece in accordance with embodiments of the present invention.

FIG. 9 is a flowchart of a method of connecting to a user 500 using a wireless earpiece 200. First, in step 202, a communication request from an electronic device 18 is received at a wireless earpiece 16. The wireless earpiece 16 may be worn, carried or in a case recharging, and the communication request may be received by auditory, gesture or tactile (e.g. a vibration) input. The electronic device 18 communicating the communications request may include a mobile phone, a tablet, a laptop, a desktop computer, a gaming system, and entertainment/media system, smart glass, smart jewelry, a helmet, an eyepiece, another wireless earpiece, a watch or other electronic devices. In addition, more than one communication request may be received at the wireless earpiece 16.

In step 204, the communication request is accepted using a gesture sensed by the wireless earpiece 16. The gesture used to accept or reject the communication request may be a head gesture/movement, a hand gesture, a finger gesture, a voice command, a sound, or anything else capable of being sensed by the wireless earpiece 16. The communication request does not require acceptance, and the rejection of the communication request may be communicated to the sender. If an additional communication request is received in step 206, then in step 208, the additional communication request may be accepted using an additional gesture sensed by the wireless earpiece. Procedures similar to step 204 may be used. If visual media 702 is being recorded in step 210, then in step 212, the visual media 702 may be communicated via the wireless earpiece 16 or the electronic device 18 recording or storing the visual media 702 to one or more users 502 connected to the wireless earpiece 16.

Figure 10:
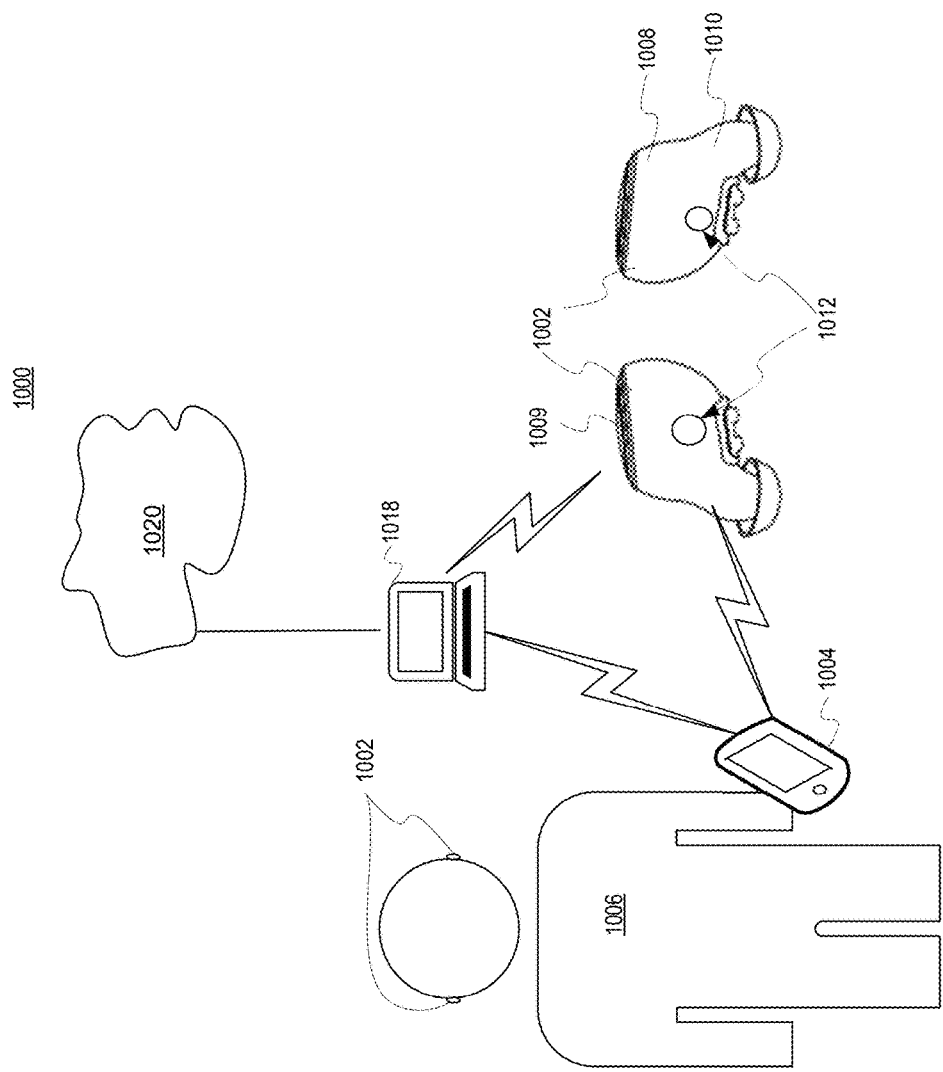
FIG. 10 is a pictorial representation of a communications environment in accordance with embodiments of the present invention.

FIG. 10 is a pictorial representation of a communications environment 1000 in accordance with an illustrative embodiment. The wireless earpieces 1002 may be configured to communicate with each other and with one or more wireless devices, such as a wireless device 1004 or a personal computer 1018 (as well as the associated software including operating systems, kernels, applications, and so forth). The wireless earpieces 1002 may be worn by a user 1006 and are shown both as worn and separately from their positioning within the ears of the user 1006 for purposes of visualization.

In one embodiment, the wireless earpieces 1002 includes a housing 1008 shaped to fit substantially within the ears of the user 1006. The housing 1008 is a support structure at least partially enclosing and housing the electronic components of the wireless earpieces 1002. The housing 1008 may be composed of a single structure or multiple interconnected structures. An exterior portion of the wireless earpieces 1002 may include a first set of sensors shown as infrared sensors 1009. The infrared sensors 1009 may include emitter and receivers detects and measures infrared light radiating from objects within its field of view. The infrared sensors 1009 may detect gestures, touches or other user input against an exterior portion of the wireless earpieces 1002 when worn by the user 1006. The infrared sensors 1009 may also detect infrared light or motion. The infrared sensors 1009 may be utilized to determine whether the wireless earpieces 1002 are being worn, moved, approached by a user, set aside, stored in a smart case, placed in a dark environment or so forth. In one embodiment, the user 1006 may configure the wireless earpieces 1002 for usage even when not worn, such as when placed on a desk or table or positioned within a smart case for charging, securing, and protecting the wireless earpieces 1002 when not in use.

The housing 1008 defines an extension 1010 configured to fit substantially within the ear of the user 1006. The extension 1010 may include one or more speakers or vibration components for interacting with the user 1006. The extension 1010 may be a removable cover as in one or more sleeves. The sleeves may be changed to fit the size and shape of the user's ears. The sleeves may come in various interchangeable sizes and may have extremely tight tolerances to fit the user 1006 and one or more additional users may utilize the wireless earpieces 1002 during their expected lifecycle. In another embodiment, the sleeves may be custom built to support the interference fit utilized by the wireless earpieces 1002 while also being comfortable while worn. The sleeves are shaped and configured to not cover various sensor devices of the wireless earpieces 1002. In other embodiments, the wireless earpieces 1002 may be docked with other devices utilized or worn by the user 1006, such as watches, glasses, headsets, jewelry, smart phones, personal computers, gaming devices or so forth.

As previously noted, the housing 1008 or the extension 1010 (or other portions of the wireless earpieces 1002) may include sensors 1012 for sensing pulse, blood oxygenation, temperature, voice characteristics, skin conduction, glucose levels, impacts, activity level, position, location, orientation as well as any number of internal or external user biometrics. In other embodiments, the sensors 1012 may be positioned to contact or be proximate the epithelium of the external auditory canal or auricular region of the user's ears when worn. For example, the sensors 1012 may represent various metallic sensor contacts, optical interfaces or even microdelivery systems for receiving, measuring and delivering information and signals. Small electrical charges or spectroscopy emissions (e.g., various light wavelengths) may be utilized by the sensors 1012 to analyze the biometrics of the user 1006 including pulse, blood pressure, skin conductivity, blood analysis, sweat levels and so forth. In one embodiment, the sensors 1012 may include optical sensors emitting and measuring reflected light within the ears of the user 1006 to measure any number of biometrics. The optical sensors may also be utilized as a second set of sensors to determine when the wireless earpieces 1002 are in use, stored, charging, or otherwise positioned. The sensors 1012 may include an array of components.

The sensors 1012 may be utilized to provide relevant information communicated through the communications engine. As described, the sensors 1012 may include one or more microphones integrated with the housing 1008 or the extension of the wireless earpieces 1002. For example, an external microphone may sense environmental noises as well as the user's voice as communicated through the air of the communications environment 1000. The external microphones may sense additional user's voices to perform recordings, analysis, actions, or otherwise facilitate the activities of the user 1006. An ear-bone or internal microphone may sense vibrations or sound waves communicated through the head of the user 1002 (e.g., bone conduction, etc.).

In some applications, temporary adhesives or securing mechanisms (e.g., clamps, straps, lanyards, extenders, etc.) may be utilized to ensure the wireless earpieces 1002 remain in the ears of the user 1006 even during the most rigorous or physical activities or to ensure if they do fall out they are not lost or broken. For example, the wireless earpieces 1002 may be utilized during marathons, swimming, team sports, biking, hiking, parachuting, or so forth. In one embodiment, miniature straps may attach to the wireless earpieces 1002 with a clip on the strap securing the wireless earpieces to the clothes, hair, or body of the user. The wireless earpieces 1002 may be configured to play music or audio, receive and make phone calls or other communications, determine ambient environmental conditions (e.g., temperature, altitude, location, speed, heading, etc.), read user biometrics (e.g., heart rate, motion, temperature, sleep, blood oxygenation, voice output, calories burned, forces experienced, etc.), and receive user input, feedback or instructions. The wireless earpieces 1002 may also execute any number of applications to perform specific purposes. The wireless earpieces 1002 may be utilized with any number of automatic assistants, such as Siri, Cortana, Alexa, Google, Watson, or other smart assistants/artificial intelligence systems.

The communications environment 1000 may further include the personal computer 1018. The personal computer 1018 may communicate with one or more wired or wireless networks, such as a network 1020. The personal computer 1018 may represent any number of devices, systems, equipment, or components, such as a laptop, server, tablet, transcription system, security system, gaming device, virtual/augmented reality system or so forth. The personal computer 1018 may communicate utilizing any number of standards, protocols or processes. For example, the personal computer 1018 may utilize a wired or wireless connection to communicate with the wireless earpieces 1002, the wireless device 1004 or other electronic devices. The personal computer 1018 may utilize any number of memories or databases to store or synchronize biometric information associated with the user 1006, data, passwords or media content. The personal computer 1018 may also include any number of databases. The wireless earpieces 1002 may store all or portions of these databases, logic, services and resources may be updated regularly as noted above.

The wireless earpieces 1002 may determine their position with respect to each other as well as the wireless device 1004 and the personal computer 1018. For example, position information for the wireless earpieces 1002 and the wireless device 1004 may determine proximity of the devices in the communications environment 1000. For example, global positioning information or signal strength/activity may be utilized to determine proximity and distance of the devices to each other in the communications environment 1000. In one embodiment, the distance information may be utilized to determine whether biometric analysis may be displayed to a user. For example, the wireless earpieces 1002 may be required to be within four feet of the wireless device 1004 and the personal computer 1018 in order to display biometric readings or receive user input. The transmission power or amplification of received signals may also be varied based on the proximity of the devices in the communications environment 1000.

In one embodiment, the wireless earpieces 1002 and the corresponding sensors 1012 (whether internal or external) may be configured to take a number of measurements or log information and activities during normal usage. This information, data, values and determinations may be reported to the user or otherwise utilized as part of a communications engine. The sensor measurements may be utilized to extrapolate other measurements, factors, or conditions applicable to the user 1006 or the communications environment 1000. For example, the sensors 1012 may monitor the user's usage patterns or light sensed in the communications environment 1000 to enter a full power mode in a timely manner. The user 1006 or another user may configure the wireless earpieces 1002 directly or through a connected device and app (e.g., mobile app with a graphical user interface) to set power settings (e.g., preferences, conditions, parameters, settings, factors, etc.) or to store or share biometric information, audio and other data. In one embodiment, the user may establish the light conditions or motion may activate the full power mode or may keep the wireless earpieces 1002 in a sleep or low power mode. As a result, the user 1006 may configure the wireless earpieces 1002 to maximize the battery life based on motion, lighting conditions, and other factors established for the user. For example, the user 1006 may set the wireless earpieces 1002 to enter a full power mode only if positioned within the ears of the user 1006 within ten seconds of being moved, otherwise the wireless earpieces 1002 remain in a low power mode to preserve battery life. This setting may be particularly useful if the wireless earpieces 1002 are periodically moved or jostled without being inserted into the ears of the user 1006. The wireless earpieces 1002 may also be utilized to perform audio or light monitoring of a specified area.

The user 1006 or another user may also utilize the wireless device 1004 to associate user information and conditions with the user preferences. For example, an application executed by the wireless device 1004 may be utilized to specify the conditions may "wake up" the wireless earpieces 1002 to automatically or manually communicate information, warnings, data, or status information to the user. In addition, the enabled functions (e.g., sensors, transceivers, vibration alerts, speakers, lights, etc.) may be selectively activated based on the user preferences as set by default, by the user, or based on historical information. In another embodiment, the wireless earpieces 1002 may be adjusted or trained over time to become even more accurate in adjusting to communications needs, activities, habits, requirements, requests, activations, or other processes or functions performed by the communications engine. The wireless earpieces 1002 may utilize historical information to generate default values, baselines, thresholds, policies, or settings for determining when and how the wireless earpieces 1002 (or associated logic/applications) performs various communications, actions, and processes. As a result, the wireless earpieces 1002 may effectively manage the automatic and manually performed processes of the wireless earpieces based on automatic detection of events and conditions (e.g., light, motion, user sensor readings, etc.) and user specified settings.

The wireless earpieces 1002 may include any number of sensors 1012 and logic for measuring and determining user biometrics, such as pulse rate, skin conduction, blood oxygenation, temperature, calories expended, blood or excretion chemistry, voice and audio output (e.g., stress level, amplitude, frequency, etc.), position, and orientation (e.g., body, head, etc.). The sensors 1012 may also determine the user's location, position, velocity, impact levels, and so forth. Any of the sensors 1012 may be utilized to detect or confirm light, motion, or other parameters may affect how the wireless earpieces 1002 manage, utilize, and initialize the communications engine. The sensors 1012 may also receive user input and convert the user input into commands or selections made across the personal devices of the personal area network. For example, the user input detected by the wireless earpieces 1002 may include voice commands, head motions, finger taps, finger swipes, motions or gestures, or other user inputs sensed by the wireless earpieces. The user input may be determined by the wireless earpieces 1002 and converted into authorization commands may be sent to one or more external devices, such as the wireless device 1004, the personal computer 1018, a tablet computer, or so forth. For example, the user 1006 may create a specific head motion and voice command when detected by the wireless earpieces 1002 are utilized to send a request to the communications engine (implemented by the wireless earpiece or wireless earpieces 1002/wireless device 1004) to perform actions, such as provide definitions, record conversations or environmental noise, search precedent for a cited case, provide stress analysis of other user's voices, and so forth. Any number of actions may also be implemented by the communications engine in response to specified user input.

The sensors 1012 may make all of the measurements regarding the user 1006 and communications environment 1000 or may communicate with any number of other sensory devices, components, or systems in the communications environment 1000. In one embodiment, the communications environment 1000 may represent all or a portion of a personal area network. The wireless earpieces 1002 may be utilized to control, communicate, manage, or interact with many other wearable devices or electronics, such as smart glasses, helmets, smart glass, watches or wrist bands, other wireless earpieces, chest straps, implants, displays, clothing, or so forth. The wireless earpieces 1002 may also communicate with cameras, microphones, or other specialized or custom systems, equipment, components, software, or devices. A personal area network is a network for data transmissions among devices, components, equipment, and systems, such as personal computers, communications devices, cameras, vehicles, entertainment/media devices, and communications devices. The personal area network may utilize any number of wired, wireless, or hybrid configurations and may be stationary or dynamic. For example, the personal area network may utilize wireless network protocols or standards, such as INSTEON, IrDA, Wireless USB, Bluetooth, Z-Wave, ZigBee, Wi-Fi, ANT+ or other applicable radio frequency signals. In one embodiment, the personal area network may move with the user 1006.

In other embodiments, the communications environment 1000 may include any number of devices, components, or so forth may communicate with each other directly or indirectly through a wireless (or wired) connection, signal, or link. The communications environment 1000 may include one or more networks and network components and devices represented by the network 1020, such as routers, servers, signal extenders, intelligent network devices, computing devices, or so forth. In one embodiment, the network 1020 of the communications environment 1000 represents a personal area network as previously disclosed. The wireless earpieces 1002 may be utilized for walkie-talkie type communications. Voice commands and input may be utilized to control the wireless earpieces 1002 as well tactile or gesture based input.

Communications within the communications environment 1000 may occur through the network 1020 or a Wi-Fi network or may occur directly between devices, such as the wireless earpieces 1002 and the wireless device 1004. The network 1020 may communicate with or include a wireless network, such as a Wi-Fi, cellular (e.g., 3G, 4G, 5G, PCS, GSM, etc.), Bluetooth, or other short range or long range radio frequency networks, signals, connections, or links. The network 1020 may also include or communicate with any number of hard wired networks, such as local area networks, coaxial networks, fiber-optic networks, network adapters, or so forth. Communications within the communications environment 1000 may be operated by one or more users, service providers, or network providers.

The wireless earpieces 1002 may play, display, communicate, or utilize any number of alerts or communications to indicate the actions, activities, communications, mode, or status are use or being implemented by the wireless earpieces 1002. For example, one or more alerts may indicate when additional wireless earpieces are within range of the wireless earpieces 1002 utilizing specific tones, verbal acknowledgements, tactile feedback, or other forms of communicated messages. For example, an audible alert and LED flash may be utilized each time the wireless earpieces 1002 send or receive communications. Verbal or audio acknowledgements, answers, and actions utilized by the wireless earpieces 1002 are particularly effective because of user familiarity with such devices in standard smart phone and personal computers. The corresponding alert may also be communicated to the user 1006, the wireless device 1004, and the personal computer 1018. In one embodiment, alerts or indicators may be utilized to indicate a message, information, or details are available to a user. For example, an audible alert, such as a beep, and a tactile alert, such as a single vibration, may indicate the wireless earpieces are receiving a communication.

In other embodiments, the wireless earpieces 1002 may also vibrate, flash, play a tone or other sound, or give other indications of the actions, status, or process of the communications. The wireless earpieces 1002 may also communicate an alert to the wireless device 1004 shows up as a notification, message, or other indicator indicating changes in status, actions, commands, or so forth.

The wireless earpieces 1002 as well as the wireless device 1004 may include logic for automatically implementing the communications logic in response to motion, light, audio, user activities, user biometric status, user location, user orientation/position, historical activity/requests, or various other conditions and factors of the communications environment 1000. A communications engine may be activated to perform a specified activity or to "listen" or be prepared to "receive" user input, feedback, or commands for implementation by the wireless earpieces 1002. The communications engine may also go into a recording or logging mode where all content or verbal communications are recorded for subsequent transcription, analysis, review, playback, or so forth.

The wireless device 1004 may represent any number of wireless or wired electronic communications or computing devices, such as smart phones, laptops, desktop computers, control systems, tablets, transcription systems, security systems, displays, gaming devices, music players, personal digital assistants, vehicle systems, or so forth as well as the associated software (e.g., operating systems, kernels, applications, etc.). The wireless device 1004 may communicate utilizing any number of wireless connections, standards, or protocols (e.g., near field communications, NFMI, Bluetooth, Wi-Fi, wireless Ethernet, etc.). For example, the wireless device 1004 may be a touch screen cellular phone communicates with the wireless earpieces 1002 utilizing Bluetooth communications. The wireless device 1004 may implement and utilize any number of operating systems, kernels, instructions, or applications may make use of the available sensor data sent from the wireless earpieces 1002. For example, the wireless device 1004 may represent any number of android, iOS, Windows, open platforms, or other systems and devices. Similarly, the wireless device 1004 or the wireless earpieces 1002 may execute any number of applications utilize the user input, proximity data, biometric data, and other feedback from the wireless earpieces 1002 to initiate, authorize, or process communications engine processes and perform the associated tasks. In one embodiment, the wireless earpieces 1002 and the wireless device 1004 may both execute communications engines may operate independently or jointly to perform the processes herein described are stored locally or accessed through the personal area network.

As noted, the layout of the internal components of the wireless earpieces 1002 and the limited space available for a product of limited size may affect where the sensors 1012 may be positioned. The positions of the sensors 1012 within each of the wireless earpieces 1002 may vary based on the model, version, and iteration of the wireless earpiece design and manufacturing process.

The illustrative embodiments may take the form of an entirely hardware embodiment, an entirely software embodiment (including firmware, resident software, micro-code, etc.) or an embodiment combining software and hardware aspects may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, may include a machine-readable medium having stored thereon instructions, which may be used to program a computing system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object-oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (e.g., through the Internet using an Internet Service Provider).

Figure 11:
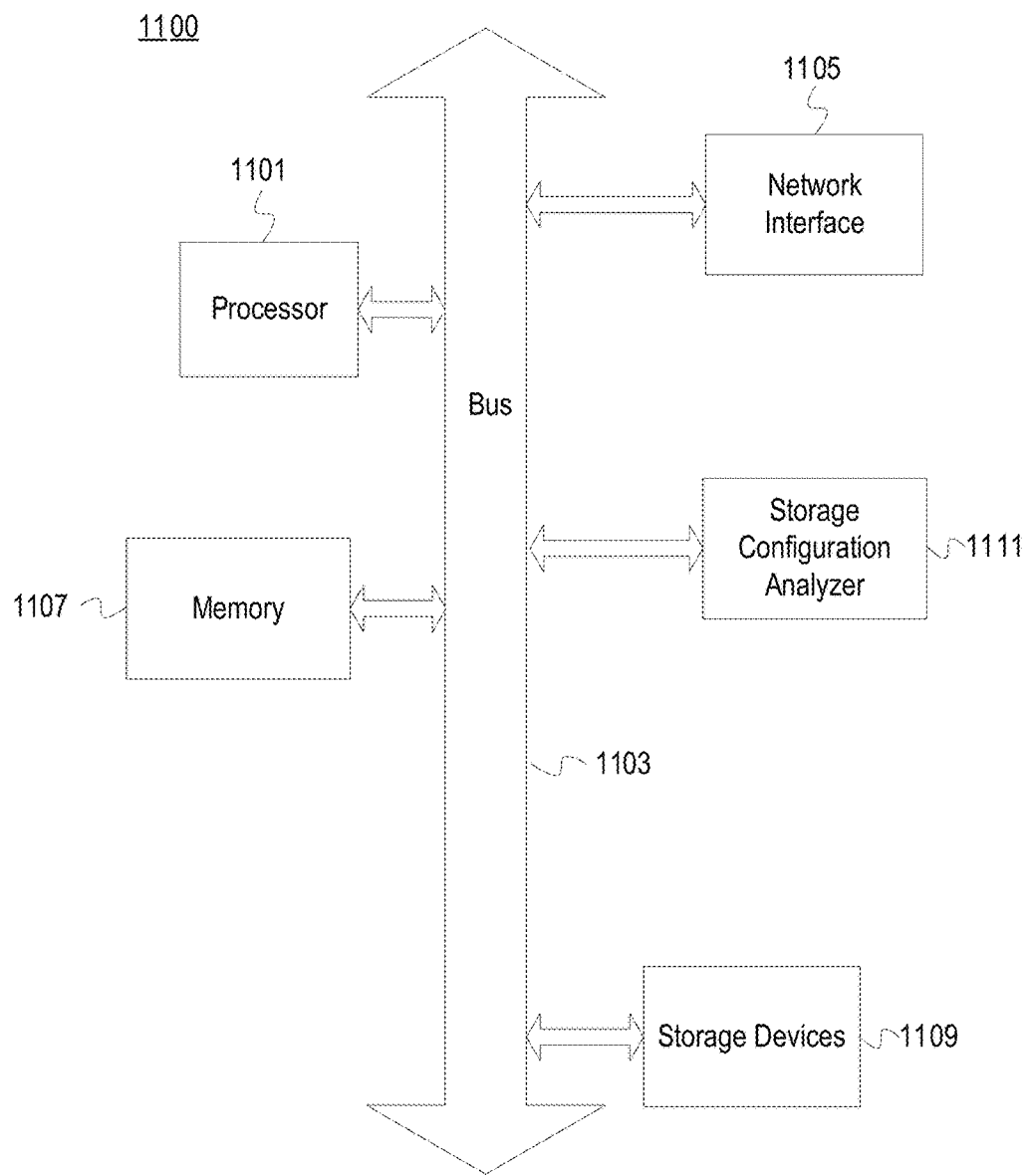
FIG. 11 depicts a computing system in accordance with embodiments of the present invention.

FIG. 11 depicts a computing system 1100 in accordance with an illustrative embodiment. For example, the computing system 1100 may represent a device, such as the wireless device 204 of FIG. 2. The computing system 1100 includes a processor unit 1101 (possibly including multiple processors, multiple cores, multiple nodes, and/or implementing multi-threading, etc.). The computing system includes memory 1107. The memory 1107 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computing system also includes a bus 1103 (e.g., PCI, ISA, PCI-Express, HyperTransport®, InfiniBand®, NuBus, etc.), a network interface 1106 (e.g., an ATM interface, an Ethernet interface, a Housing Relay interface, SONET interface, wireless interface, etc.), and a storage device(s) 1109 (e.g., optical storage, magnetic storage, etc.). The system memory 1107 embodies functionality to implement all or portions of the embodiments described above. The system memory 1107 may include one or more applications or sets of instructions for implementing a communications engine to communicate with one or more wireless earpieces and/or electronic devices. The communications engine may be stored in the system memory 1107 and executed by the processor unit 1102. As noted, the communications engine may be similar or distinct from a communications engine utilized by the wireless earpieces (e.g., a walkie-talkie application). Code may be implemented in any of the other devices of the computing system 1100. Any one of these functionalities may be partially (or entirely) implemented in hardware and/or on the processing unit 1101. For example, the functionality may be implemented with an application specific integrated circuit, in logic implemented in the processing unit 1101, in a co-processor on a peripheral device or card, etc. Further, realizations may include fewer or additional components not illustrated in FIG. 11 (e.g., video cards, audio cards, additional network interfaces, peripheral devices, etc.). The processor unit 1101, the storage device(s) 1109, and the network interface 1105 are coupled to the bus 1103. Although illustrated as being coupled to the bus 1103, the memory 1107 may be coupled to the processor unit 1101. The computing system 1100 may further include any number of optical sensors, accelerometers, magnetometers, microphones, gyroscopes, temperature sensors, and so forth for verifying user biometrics, or environmental conditions, such as motion, light, or other events may be associated with the wireless earpieces or their environment.

Figure 12:
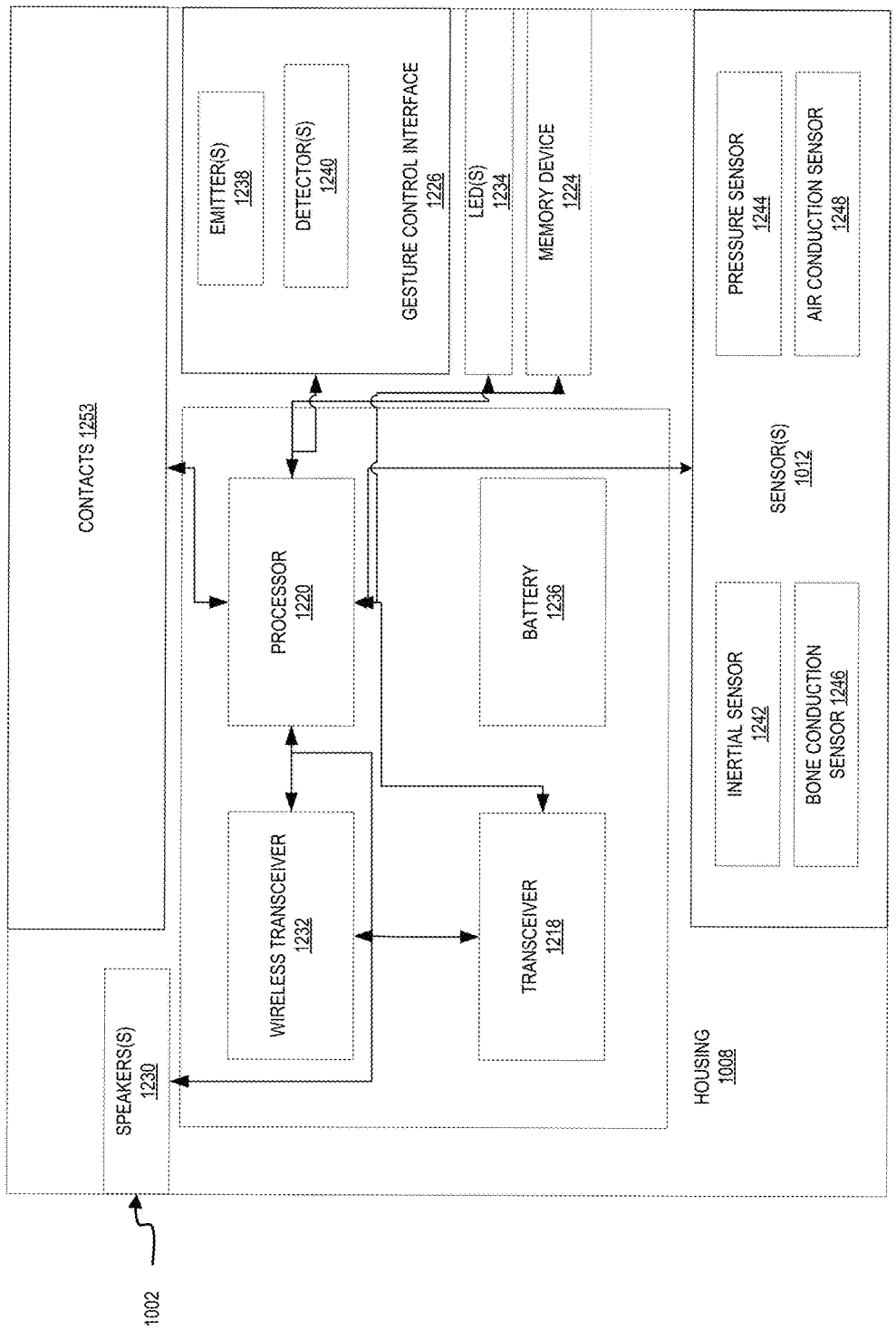
FIG. 12 depicts a block diagram representation of a wireless earpiece in accordance with an embodiment of the present invention.

FIG. 12 illustrates an embodiment of the plurality of wireless earpieces 1002. In addition to the elements described in FIG. 10, one or more of the wireless earpieces 1002 of the plurality of wireless earpieces 1002 may further comprise one or more bone or air conduction sensors 1246 & 1248, a memory device 1224, a gesture interface 1226, a speaker 1230, a wireless transceiver 1232, LEDs 1234 and a battery 1236. The housing 1008, the sensor 1012, the transceiver 1218, and the processor 1220 perform the same functions as outlined in FIG. 10, and the plurality of wireless earpiece 1002 may comprise more than one processor 1220.

A bone or air conduction sensors 1246 & 1248 may be operatively connected to a housing 1008 and may be configured to sense a voice command or to sense one or more sounds generated by the user or by one or more objects in operative contact with the user possibly used in conjunction with sensor readings by one or more sensors 1012. For example, if a microphone picks up the snapping sound of fingers, the sounds may be used by a processor 1220 along with one or more sensor 1012 readings to determine if the snapping of fingers is associated with user 500 wishing to initiate communication with a secondary user 502. The user 500 may also issue a voice command 510 to one or more of the wireless earpieces 1002 to control, change or modify one or more of the functions of one of the wireless earpieces 1002.

A memory device 1224 may be operatively connected to the housing 1008 and may have user data associated with kinetic actions and/or gestures stored within and may also have one or more algorithms stored within possibly used to determine if one or more pieces of data associated with a gesture are related to a function to be performed. In addition, the memory device 1224 may store data or information regarding other components of the plurality of wireless earpieces 1002. For example, the memory device 1224 may store data or information derived from signals received from one of the transceivers 1218 or the wireless transceiver 1232, data or information regarding the processing of video 702, transcription logs 700 and/or communications with users 502, algorithms governing command protocols related to the gesture interface 1226 or algorithms governing LED 1234 protocols. The aforementioned list is non-exclusive.

The memory 1224 is a hardware component, device, or recording media configured to store data for subsequent retrieval or access at a later time. The memory 1224 may be static or dynamic memory. The memory 1224 may include a hard disk, random access memory, cache, removable media drive, mass storage, or configuration suitable as storage for data, instructions and information. In one embodiment, the memory 1224 and the processor 1220 may be integrated. The memory 1224 may use any type of volatile or non-volatile storage techniques and mediums. The memory 1224 may store information related to the status of a user, such as user groups 504 used previously, wireless earpieces 1002 and other peripherals, such as another electronic device 18, smart watch and so forth. In one embodiment, the memory 1224 may display instructions or programs for controlling the gesture control interface 1226 including one or more LEDs or other light emitting components 1238, speakers 1230, tactile generators (e.g., vibrator) and so forth. The memory 1224 may also store the user input information associated with each command, such as an instruction for communications with users 502. The memory 1224 may also store default, historical or user specified information regarding settings, configuration or performance of the wireless earpieces 1002 (and components thereof) based on the user contact with contacts 1253 and/or gesture control interface 1226.

The memory 1224 may store settings and profiles associated with users, speaker settings (e.g., position, orientation, amplitude, frequency responses, etc.) and other information and data may be utilized to operate the wireless earpieces 1002. The wireless earpieces 1002 may also utilize biometric information to identify the user so settings and profiles may be associated with the user 500. In one embodiment, the memory 1224 may include a database of applicable information and settings. In one embodiment, applicable gesture information received from the contacts 1253 may be looked up from the memory 1224 to automatically implement associated settings and profiles.

A gesture interface 1226 may be operatively connected to the housing 1008 and may be configured to allow a user 500 to control one or more functions of one or more of the plurality of wireless earpieces 1002. The gesture interface 1226 may include at least one emitter 1238 and at least one detector 1240 to detect gestures from either the user 500, a third-party 502, an mobile device 18, or a combination of the aforementioned and communicate the gesture to the processor 1220. The gestures possibly used with the gesture interface 1226 to control a wireless earpiece 1002 include, without limitation, touching, tapping, swiping, use of an instrument, or any combination of the aforementioned gestures. Touching gestures used to control the wireless earpiece 1002 may be of any duration and may include the touching of areas not part of the gesture interface 1226. Tapping gestures used to control the wireless earpiece 1002 may include any number of taps and need not be brief. Swiping gestures used to control the wireless earpiece 1002 may include a single swipe, a swipe changing direction at least once, a swipe with a time delay, a plurality of swipes, or any combination of the aforementioned. An instrument used to control the wireless earpiece 1002 may be electronic, biochemical or mechanical, and may interface with the gesture interface 1226 either physically or electromagnetically.

The gesture interface 1226 is a hardware interface for receiving commands, instructions or input through the touch (haptics) of the user, voice commands 510 (e.g., through bone or air conduction sensors 1246 & 1248) or pre-defined motions (508). The gesture interface 1226 may be utilized to control the other functions of the wireless earpiece 1002. The gesture interface 1226 may include an LED array, one or more touch sensitive buttons, or portions, a miniature screen or display or other input/output components. The gesture interface 1226 may be controlled by the user or based on commands received from a mobile device 18, a linked wireless device, such as another wireless earpiece 1002 and/or network 24.

In one embodiment, the user may provide feedback by tapping the gesture interface 1226 once, twice, three times or any number of times. Similarly, a swiping motion may be utilized across or in front of the gesture interface 1226 to implement a predefined action. Swiping motions in any number of directions may be associated with specific activities, such as play music, pause, fast forward, rewind, activate a digital assistant (e.g., Siri, Cortana, smart assistant, etc.), end a phone call, make a phone call and so forth. The swiping motions may also be utilized to control actions and functionality of the wireless earpiece 1002 or other external devices (e.g., smart television, camera array, smart watch, etc.). The user may also provide user input by moving her head in a particular direction or motion or based on the user's position or location. For example, the user 500 may utilize voice commands 510, head gestures 508 or touch commands to change the content being presented audibly. The gesture interface 1226 may include image sensors or other sensors 1012 for sensing motions, gestures, or symbols provided as feedback or instructions.

Although shown as part of the gesture interface 1226, contacts 1253 may also be integrated with other components or subsystems of the wireless earpiece 1002, such as the sensors 1012. The contacts 1253 may detect physical contact or interaction with the user 500 or users 502. In another embodiment, the contacts 1253 may detect the proximity of the user 502 to determine if communications can occur.

In another embodiment, the contacts 1253 may be configured to provide user feedback. For example, the contacts 1253 may be utilized to send tiny electrical pulses to the user. For example, a current may be communicated between different portions of the wireless earpiece 1002. For example, current expressed inferior to the wireless earpiece 1002 may indicate a text message has been received, current expressed superior to the wireless earpiece 1002 may indicate a video 702 has been received, and a current expressed proximate the skin may indicate a walkie-talkie commination is incoming from user 502.

In another embodiment, the contacts 1253 may be micro air emitters which similarly provide feedback or communications to the user. The micro air emitters may utilize actuators, arms, or miniaturized pumps to generate tiny puffs of air/gas provide feedback to the user 500. In yet another embodiment, the contacts 1253 may be utilized to analyze fluid or tissue analysis from the user 500. The samples may be utilized to determine biometrics (e.g., glucose levels, adrenaline, thyroid levels, hormone levels, etc.).

A speaker 1230 may be operatively connected to the housing 1008 and may communicate one or more pieces of media or information if desired by the user 500. For example, if a user 500 snaps his fingers twice to instruct a wireless earpiece 1002 to switch to a new song during a jogging workout, one or more sensors 1012 may sense the finger snaps as minute vibrations and communicate the current or voltage changes to the processor 1220 which may associate the finger snaps with an intent to switch to a new song and instruct the speaker 1230 to communicate the new song to the user.

A wireless transceiver 1232 may be disposed within the housing 1008 and may receive signals from or transmit signals to a mobile device 18 or network 24 outside the wireless earpiece 1002. The signals received from or transmitted by the wireless transceiver 1232 may encode data or information related to media or information related to news, current events, or entertainment, information related to the health of a user 500 or a third party 502, information regarding the location of a user 500 or third party 502, or the functioning of a wireless earpiece 1002. For example, if a user 500 desires to download data to a memory device 1224 from a mobile device 18 or a laptop, the user 500 may perform an action which may be sensed by a sensor 1012 and/or contact 1253 and communicated directly via a wireless transceiver 1232 or indirectly via a transceiver 1218 to another wireless earpiece 1002 which has a wireless transceiver 1232 to the mobile device 18 or laptop 1018 instructing the mobile device 18 or laptop 1018 to download the data to the memory device 1224. More than one signal may be received from or transmitted by the wireless transceiver 1232.

One or more LEDs 1234 may be operatively connected to the housing 1008 and may be configured to provide information concerning the wireless earpiece 1002. For example, the processor 1220 may communicate a signal encoding information related to the current time, the battery life of the wireless earpiece 1002, the status of an operation of another wireless earpiece 1002, or another wireless earpiece 1002 function, wherein the signal is decoded and displayed by the LEDs 1234. For example, the processor 1220 may communicate a signal encoding the status of the energy level of a wireless earpiece 1002, wherein the energy level may be decoded by LEDs 1234 as a blinking light, wherein a green light may represent a substantial level of battery life, a yellow light may represent an intermediate level of battery life, and a red light may represent a limited amount of battery life, and a blinking red light may represent a critical level of battery life requiring immediate attention. In addition, the battery life may be represented by the LEDs 1234 as a percentage of battery life remaining or may be represented by an energy bar comprising one or more LEDs wherein the number of illuminated LEDs represents the amount of battery life remaining in the wireless earpiece 1002. The LEDs 1234 may be located in any area on a wireless earpiece 1002 suitable for viewing by the user 500 or a third party and may consist of as few as one diode which may be provided in combination with a light guide. In addition, the LEDs 1234 need not have a minimum luminescence.

A battery 1236 may be operatively connected to all of the components within a wireless earpiece 1002. The battery 1236 should provide enough power to operate the wireless earpiece 1002 for a reasonable duration of time. The battery 1236 may be of any type suitable for powering the wireless earpiece 1002. However, the battery 1236 need not be present in the wireless earpiece 1002. Alternative battery-less power sources, such as sensors configured to receive energy from radio waves (all of which are operatively connected to one or more wireless earpiece 1002) may be used to power a wireless earpiece 1002 in lieu of a battery 1236. The battery 1236 is a power storage device configured to power the wireless earpiece 1002. In other embodiments, the battery 1236 may represent a fuel cell, thermal electric generator, piezo electric charger, solar charger, ultra-capacitor or other existing or developing power storage technologies.

Although wireless earpieces of an ear bud style are shown and described, it is to be understood that other configurations of earpiece wearables may be used including headsets with left and right ear portions and a band spanning the left and right portions. Other types of wearable devices may also be used which include at least a speaker, microphone, and wireless transceiver.

The invention is not to be limited to the particular embodiments described herein. The foregoing description has been presented for purposes of illustration and description. It is not intended to be an exhaustive list or limit any of the invention to the precise forms disclosed. It is contemplated other alternatives or exemplary aspects are considered included in the invention. The description is merely examples of embodiments, processes or methods of the invention. It is understood any other modifications, substitutions, and/or additions can be made, which are within the intended spirit and scope of the invention.

What is claimed is:

1. A method of audio messaging between users of earpiece wearables, the method comprising:
  connecting an earpiece wearable associated with a first user with an earpiece wearable associated with a second user wherein at least one of the earpiece wearable of the first user comprises a first earpiece housing configured to fit inside the ear of the first user and the earpiece wearable of the second user comprises a second earpiece housing configured to fit inside the ear of the second user;
  sending and receiving audio messages between the earpiece wearable associated with the first user and the earpiece wearable associated with the second user, wherein the sending of the audio messages is activated by head movement sensed with an inertial sensor of the earpiece wearable performing the sending;

after the sending and receiving of the audio messages, maintaining a record of the audio messages stored on a machine-readable memory of at least one of the earpiece wearable associated with the first user and the earpiece wearable associated with the second user.

2. The method of claim 1 further comprising further connecting the earpiece wearable associated with the first user and the earpiece wearable associated with the second user with an earpiece wearable associated with a third user.

3. The method of claim 1 further comprising connecting the earpiece wearable associated with the first user with a mobile device associated with the first user, the mobile device having a display, and presenting a visual display on the mobile display listing one or more users for audio messaging, the one or more users for audio messaging including the second user.

4. The method of claim 3 wherein the one or more users are located proximate to the first user.

5. The method of claim 3 wherein the second user and the first user are within a group and wherein the listing of the one or more users for audio messaging comprises listing one or more groups.

6. The method of claim 3 further comprising sending a request from the first user to the second user for audio messaging and receiving an acceptance of the request from the second user to the first user.

7. The method of claim 6 further comprising receiving a head movement from the second user indicative of the acceptance of the request using an inertial sensor of the earpiece wearable of the second user.

8. The method of claim 6 further comprising receiving a gesture from the second user indicative of the acceptance of the request using a gestural interface of the earpiece wearable of the second user.

9. The method of claim 1 wherein the earpiece wearable associated with the first user earpiece processes audio messages from the earpiece wearable associated with the second user in order to provide 3D sound representation of the audio messages from the earpiece wearable associated with the second user.

10. The method of claim 1 wherein the earpiece wearable associated with the first user earpiece processes audio messages from the earpiece wearable associated with the second user in order to provide 3D sound representation of the audio messages from the earpiece wearable associated with the second user based on relative location of the second user to the first user.

11. The method of claim 10 further comprising connecting the earpiece wearable associated with the first user with a mobile device associated with the first user, the mobile device having a display, and presenting a visual display on the mobile display including a map showing the relative location of the second user to the first user.

12. The method of claim 1 further comprising performing a speech to text conversion of the audio messages to generate a chat log between the users of the earpiece wearables.

13. The method of claim 12 further comprising synchronizing the chat log with additional content.

14. The method of claim 13 wherein the additional content comprises imagery.

15. The method of claim 13 wherein the additional content comprises data collected by the earpiece wearable contemporaneously with the audio messaging.

16. The method of claim 12 wherein a processor within at least one of the earpiece wearables performs the speech to text conversion of the audio messages.

17. The method of claim 1 wherein the earpiece wearable comprises a left earpiece and a right earpiece, each of the left earpiece and the right earpiece having at least one microphone and at least one speaker.

18. A method of audio messaging between users of in ear earpiece wearables, the method comprising:
 connecting an earpiece wearable associated with a first user and configured to fit into an ear of the first user with an earpiece wearable associated with a second user configured to fit into an ear of the second user;
 sending and receiving audio messages between the earpiece wearable associated with the first user and the earpiece wearable associated with the second user, wherein the sending of the audio messages is activated by a head gesture sensed by an inertial sensor of the earpiece wearable performing the sending;
 after the sending and receiving of the audio messages, maintaining a record of the audio messages stored on a machine-readable memory of at least one of the earpiece wearable associated with the first user and the earpiece wearable associated with the second user.

19. The method of claim 18 wherein the gesture is a hand movement sensed by a gestural interface of the earpiece wearable performing the sending.

20. A method of audio messaging between users of in ear earpiece wearables, the method comprising:
 connecting a first earpiece wearable associated with a first user with a second earpiece wearable associated with a second user by establishing a wireless connection between transceivers of the earpiece wearables;
 sensing a head gesture by the first user with an inertial sensor of the first earpiece wearable;
 interpreting by a processor of the first earpiece wearable the head gesture by the first user to activate communications between the first earpiece wearable and the second earpiece wearable;
 sensing audio at a microphone of the first earpiece wearable;
 processing the audio at the processor of the first earpiece to form an audio message;
 communicating the audio message to a wireless transceiver at the first earpiece wearable for transmitting to the second earpiece wearable;
 storing the audio message in a memory of the first earpiece wearable;
 receiving an incoming audio message at a wireless transceiver of the first earpiece wearable;
 transducing the incoming message at a speaker of the first earpiece wearable; and
 storing the incoming audio message in the memory of the first earpiece wearable.

* * * * *